(12) United States Patent
Fukazawa et al.

(10) Patent No.: US 11,036,351 B2
(45) Date of Patent: Jun. 15, 2021

(54) INFORMATION PROCESSING DEVICE AND INFORMATION PROCESSING METHOD

(71) Applicant: SONY CORPORATION, Tokyo (JP)

(72) Inventors: Ryo Fukazawa, Kanagawa (JP); Akane Kondo, Tokyo (JP); Kei Nitta, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/633,711

(22) PCT Filed: Jul. 25, 2018

(86) PCT No.: PCT/JP2018/027839
§ 371 (c)(1),
(2) Date: Jan. 24, 2020

(87) PCT Pub. No.: WO2019/026713
PCT Pub. Date: Feb. 7, 2019

(65) Prior Publication Data
US 2020/0210051 A1 Jul. 2, 2020

(30) Foreign Application Priority Data
Aug. 4, 2017 (JP) .............................. JP2017-151475

(51) Int. Cl.
G06F 3/0481 (2013.01)
G02B 27/01 (2006.01)
(Continued)

(52) U.S. Cl.
CPC ..... *G06F 3/04815* (2013.01); *G02B 27/0172* (2013.01); *G06F 3/04845* (2013.01);
(Continued)

(58) Field of Classification Search
None
See application file for complete search history.

(56) References Cited

U.S. PATENT DOCUMENTS

2007/0296646 A1 12/2007 Yamamoto et al.
2008/0024597 A1 1/2008 Yang et al.
(Continued)

FOREIGN PATENT DOCUMENTS

CN 108027652 A 5/2018
EP 2466423 A1 6/2012
(Continued)

OTHER PUBLICATIONS

International Search Report and Written Opinion of PCT Application No. PCT/JP2018/027839, dated Oct. 9, 2018, 14 pages of ISRWO.

*Primary Examiner* — Nicholas J Lee
(74) *Attorney, Agent, or Firm* — Chip Law Group

(57) ABSTRACT

The present technique relates to an information processing device, an information processing method, and a program for enabling presentation of information to a user in a more easy-to-understand manner according to the situation. A control section controls an output associated with a position of an object which is disposed in a three-dimensional space, on the basis of user action information indicating a user's action and a position relationship between a display region of a display device and the object. The present technique is applicable to an AR-use display device.

19 Claims, 34 Drawing Sheets

(51) Int. Cl.
*G06F 3/0484* (2013.01)
*G06T 19/00* (2011.01)

(52) U.S. Cl.
CPC ...... *G06T 19/006* (2013.01); *G02B 2027/014* (2013.01); *G02B 2027/0138* (2013.01); *G02B 2027/0178* (2013.01)

(56) References Cited

U.S. PATENT DOCUMENTS

| | | |
|---|---|---|
| 2012/0119988 A1 | 5/2012 | Izumi |
| 2014/0111427 A1 | 4/2014 | Lindley et al. |
| 2016/0209916 A1 | 7/2016 | Sendai et al. |
| 2016/0364916 A1 | 12/2016 | Terahata |
| 2017/0200296 A1* | 7/2017 | Jones ...................... G06F 40/58 |

FOREIGN PATENT DOCUMENTS

| | | |
|---|---|---|
| JP | 2008-033219 A | 2/2008 |
| JP | 2008-033891 A | 2/2008 |
| JP | 2010-146481 A | 7/2010 |
| JP | 2011-039844 A | 2/2011 |
| JP | 2017-004357 A | 1/2017 |
| JP | 2017-091433 A | 5/2017 |
| KR | 10-2008-0010502 A | 1/2008 |
| WO | 2010/073928 A1 | 7/2010 |
| WO | 2011/018901 A1 | 2/2011 |
| WO | 2014/107410 A1 | 7/2014 |
| WO | 2016/199492 A1 | 12/2016 |
| WO | 2017/047178 A1 | 3/2017 |

\* cited by examiner

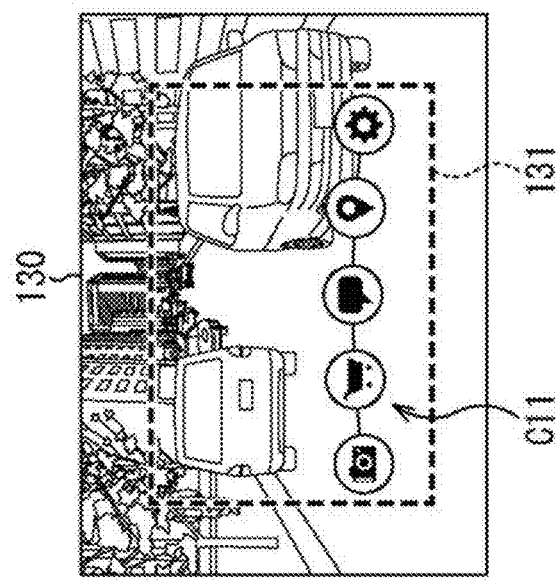
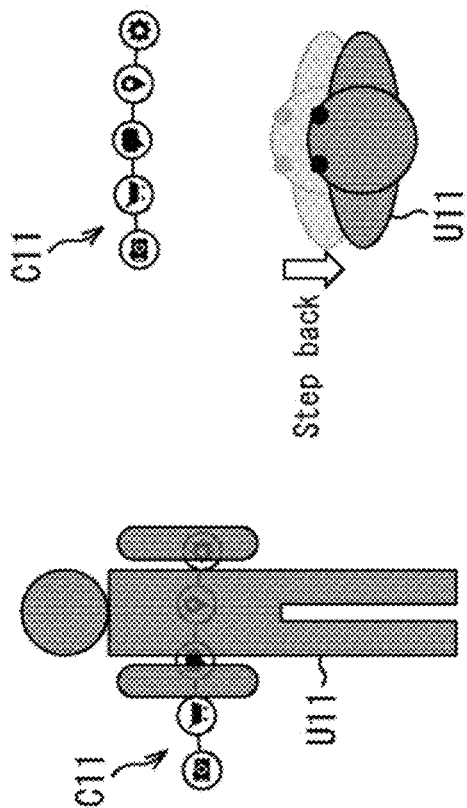
FIG. 8A
FIG. 8B
FIG. 8C

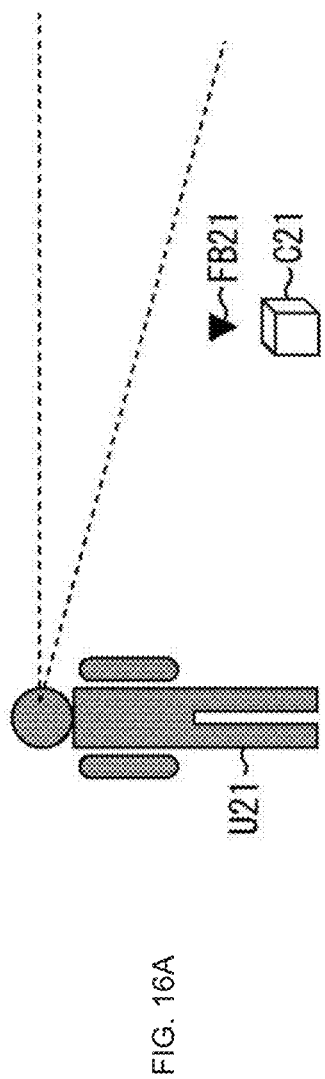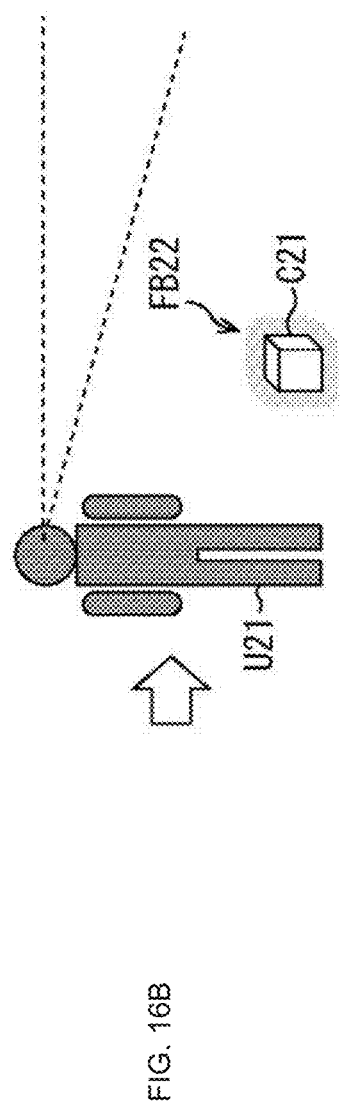
FIG. 16A
FIG. 16B

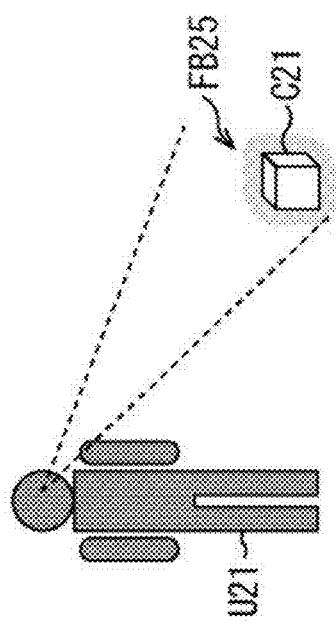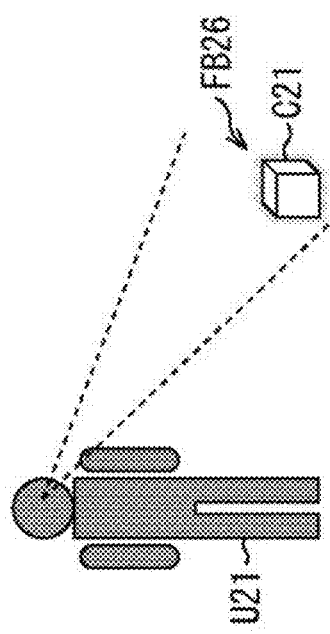
FIG. 18A
FIG. 18B

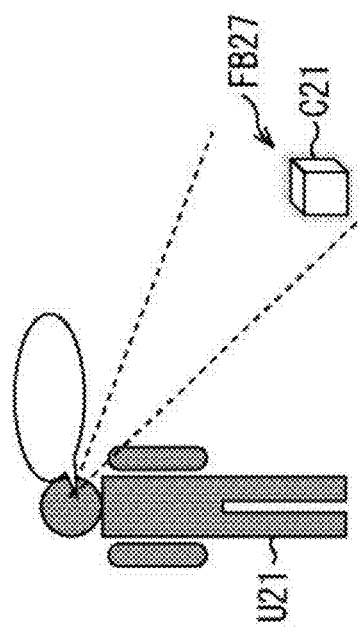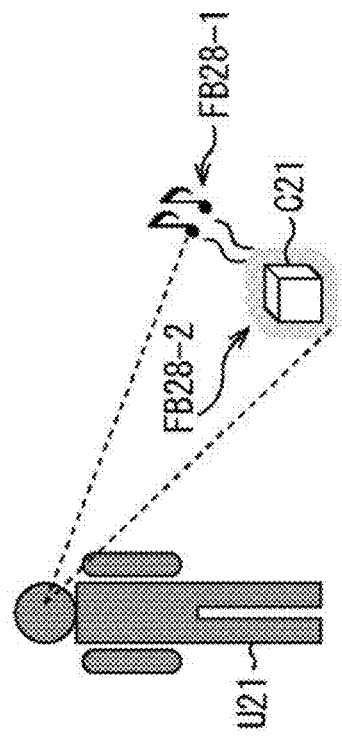
FIG. 19A
FIG. 19B

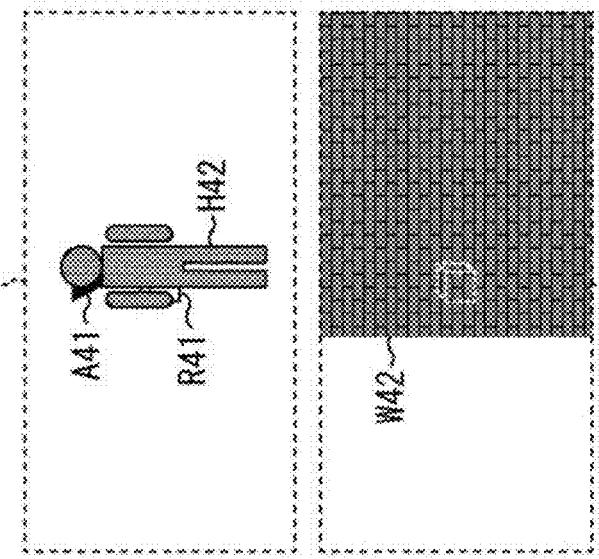
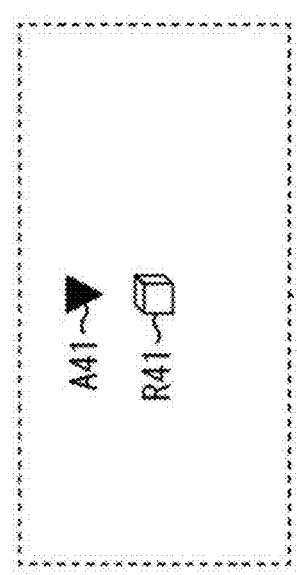
FIG. 28B
FIG. 28C
FIG. 28A

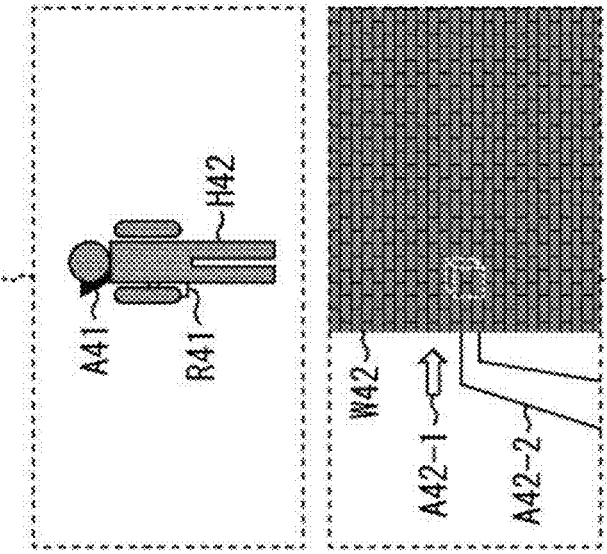
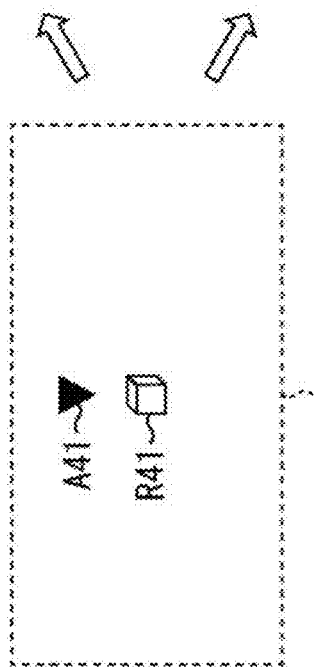

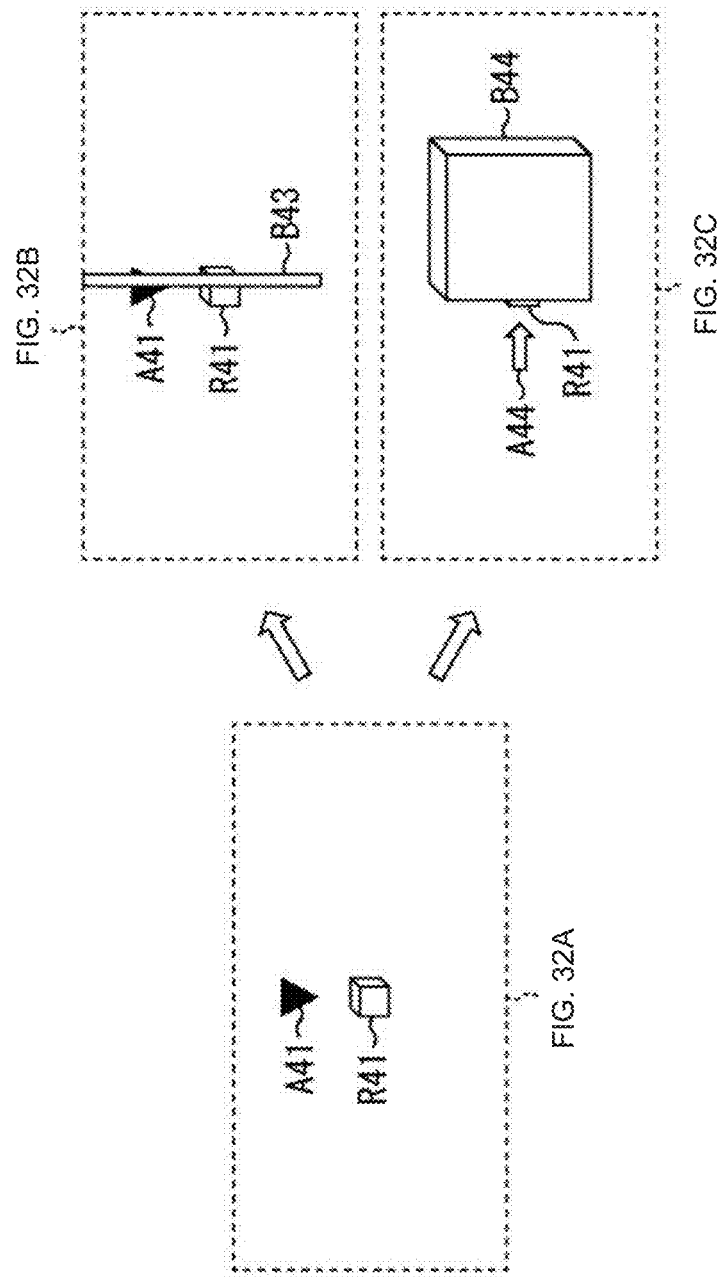

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/027839 filed on Jul. 25, 2018, which claims priority benefit of Japanese Patent Application No. JP 2017-151475 filed in the Japan Patent Office on Aug. 4, 2017. Each of the above-referenced applications is hereby incorporated herein by reference in its entirety.

TECHNICAL FIELD

The present technique relates to an information processing device, an information processing method, and a program, and particularly, relates to an information processing device, an information processing method, and a program for enabling presentation of information to a user in a more easy-to-understand manner.

BACKGROUND ART

A technique called AR (Augmented Reality) has been known which presents additional information to a user by superimposing the information in a real space. Information which is presented to a user by the AR technique may also be called an annotation. An annotation is made visible through a virtual object in various forms such as texts, icons, and animations.

For example, PTL 1 discloses a technique of associating an annotation with a position in a real space, or associating an annotation with a substance that is present in a real space.

In particularly recent years, an AR-use HMD (Head-Mounted Display; hereinafter, referred to as AR-HMD) is becoming popular as a wearable terminal for displaying such an annotation in a real space. Note that an eyeglass-type AR-use HMD is called AR eyeglasses, in some cases. In addition, besides wearable terminals, HUDs (Head-Up Displays) have been known as devices capable of performing AR display.

CITATION LIST

Patent Literature

[PTL 1]
PCT Patent Publication No. WO2014/162823

SUMMARY

Technical Problem

However, in general AR-use displays, display regions are limited, so that information cannot be necessarily presented to a user in an easy-to-understand manner depending on the situation.

The present technique has been made in view of these circumstances, and is configured to enable presentation of information to a user in a more easy-to-understand manner according to the situation.

Solution to Problem

An information processing device according to a first aspect of the present technique includes a control section that controls an output associated with a position of an object which is disposed in a three-dimensional space, on the basis of user action information indicating a user's action and a position relationship between a display region of a display device and the object.

An information processing method according to the first aspect of the present technique includes controlling an output associated with a position of an object which is disposed in a three-dimensional space, on the basis of user action information indicating a user's action and a position relationship between a display region of a display device and the object.

A program according to the first aspect of the present technique causes a computer to execute a process including controlling an output associated with a position of an object which is disposed in a three-dimensional space, on the basis of user action information indicating a user's action and a position relationship between a display region of a display device and the object.

In the first aspect of the present technique, an output associated with a position of an object which is disposed in a three-dimensional space is controlled on the basis of user action information indicating a user's action and a position relationship between a display region of a display device and the object.

An information processing device according to a second aspect of the present technique includes a control section that controls a display device such that a virtual object which is given to a first real object is changed on the basis of a position relationship between the first real object and a second real object which is different from the first real object and a parameter concerning the second real object.

In the second aspect of the present technique, a control device is controlled such that a virtual object which is given to a first real object is changed on the basis of the position relationship between the first real object and a second real object which is different from the first real object and a parameter concerning the second real object.

Advantageous Effect of Invention

According to the present technique, information can be presented to a user in a more easy-to-understand manner according to the situation.

Note that the effects described above are not limited, and any of effects described in the present disclosure may be provided.

BRIEF DESCRIPTION OF DRAWINGS

FIGS. 8A, 8B, and 8C depict diagrams for explaining a bird's eye view layout.

FIGS. 16A and 16B depict diagrams for explaining the distance from a user and a feedback output.

FIGS. 18A and 18B depict diagrams for explaining a user's action and a feedback output.

FIGS. 19A and 19B depict diagrams for explaining a user's action and a feedback output.

FIGS. 28A, 28B, and 28C depict diagrams for explaining limitations on a display region of the AR-HMD.

FIGS. 31A, 31B, and 31C depict diagrams for explaining an example of a feedback output.

FIGS. 32A, 32B, and 32C depict diagrams for explaining an example of a feedback output.

DESCRIPTION OF EMBODIMENTS

Hereinafter, modes for implementing the present disclosure (hereinafter, referred to as embodiments) will be explained. Note that explanations will be given in accordance with the following order.

1. Outline of AR-HMD to Which Technique According to Present Disclosure Has Been Applied 2. First Embodiment (Switching of Content Display Layout in Accordance with User's Action)

3. Second Embodiment (Switching of Feedback Output Format in Accordance with User's Action)

4. Third Embodiment (Determination of Feedback Output Pattern in Accordance with User's Position)

5. Fourth Embodiment (Change in Feedback Display Format in Accordance with Surrounding Environment)

<1. Outline of AR-HMD to which Technique According to Present Disclosure Has Been Applied>

(Appearance Configuration of an AR-HMD)

Figure 1:
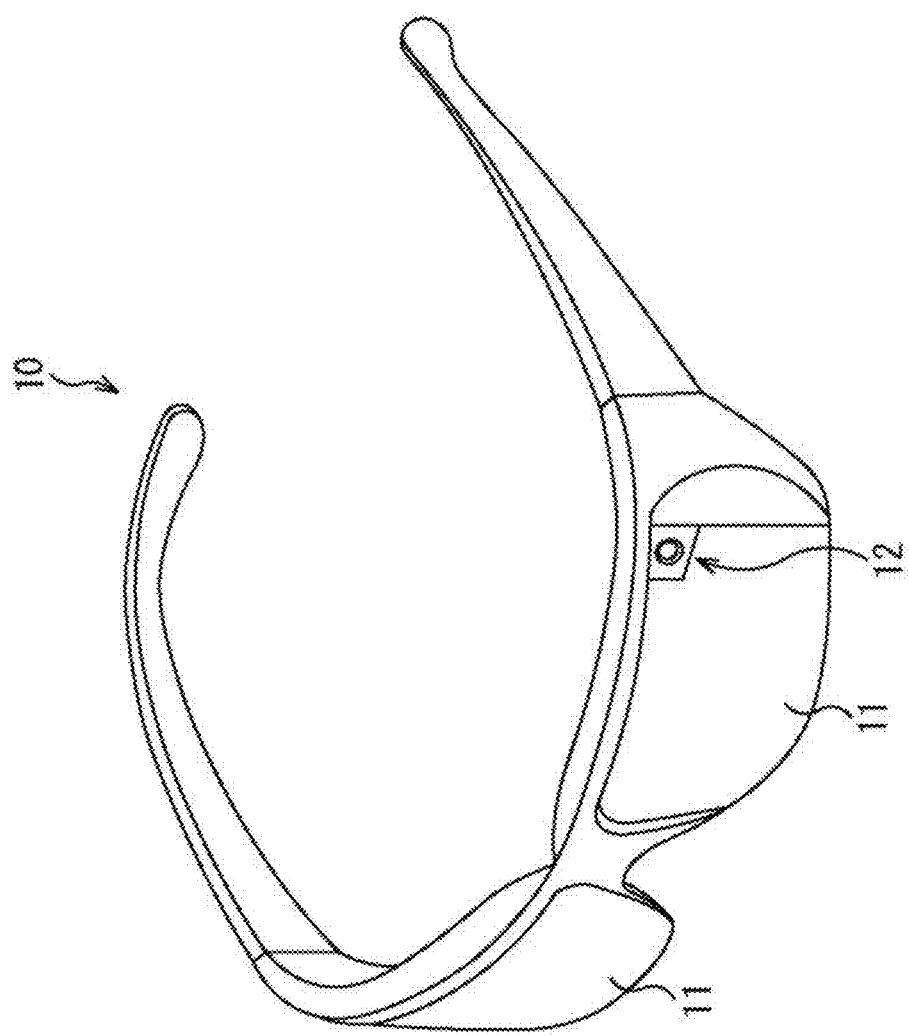
FIG. 1 is a diagram depicting an appearance configuration of an AR-HMD to which a technique according to the present disclosure has been applied.

FIG. 1 is a diagram depicting an appearance configuration of an AR-HMD to which a technique according to the present disclosure has been applied.

An AR-HMD 10 in FIG. 1 has an eyeglass shape as a whole, and includes display sections 11 and a camera 12.

The display sections 11 correspond to lens portions of the eyeglass, and the entirety thereof is formed as a transmission type display, for example. Therefore, the display sections 11 carry out transmissive superimposition display of an annotation (virtual object) on a real world image (real object) being visually recognized directly by a user.

The camera 12 is provided at an end of the display section 11 that corresponds to the left eye of a user wearing the AR-HMD 10, and captures an image of a real space included in the visual field of the user. The camera 12 is formed by using a solid state imaging element such as a CCD (Charge Coupled Device) image sensor or a CMOS (Complementary Metal Oxide Semiconductor) image sensor. Note that multiple CCD image sensors and multiple CMOS image sensors may be provided. In other words, the camera 12 may be configured as a stereo camera.

The display sections 11 can be configured to display an image acquired by the camera 12, and can be configured to perform superimposition display of an annotation on the image.

In addition, various types of sensors, buttons, and loudspeakers (not depicted) are housed or installed in a casing, of the AR-HMD 10, corresponding to an eyeglass frame.

Note that the shape of the AR-HMD 10 is not limited to the shape depicted in FIG. 1, and various shapes such as a hat shape, a belt shape which is fixed around a user's head, and a helmet shape for covering the whole head part of a user, can be adopted. In other words, the technique according to the present disclosure is applicable to HMDs in general.

Configuration Example of AR-HMD as Information Processing Device

Figure 2:
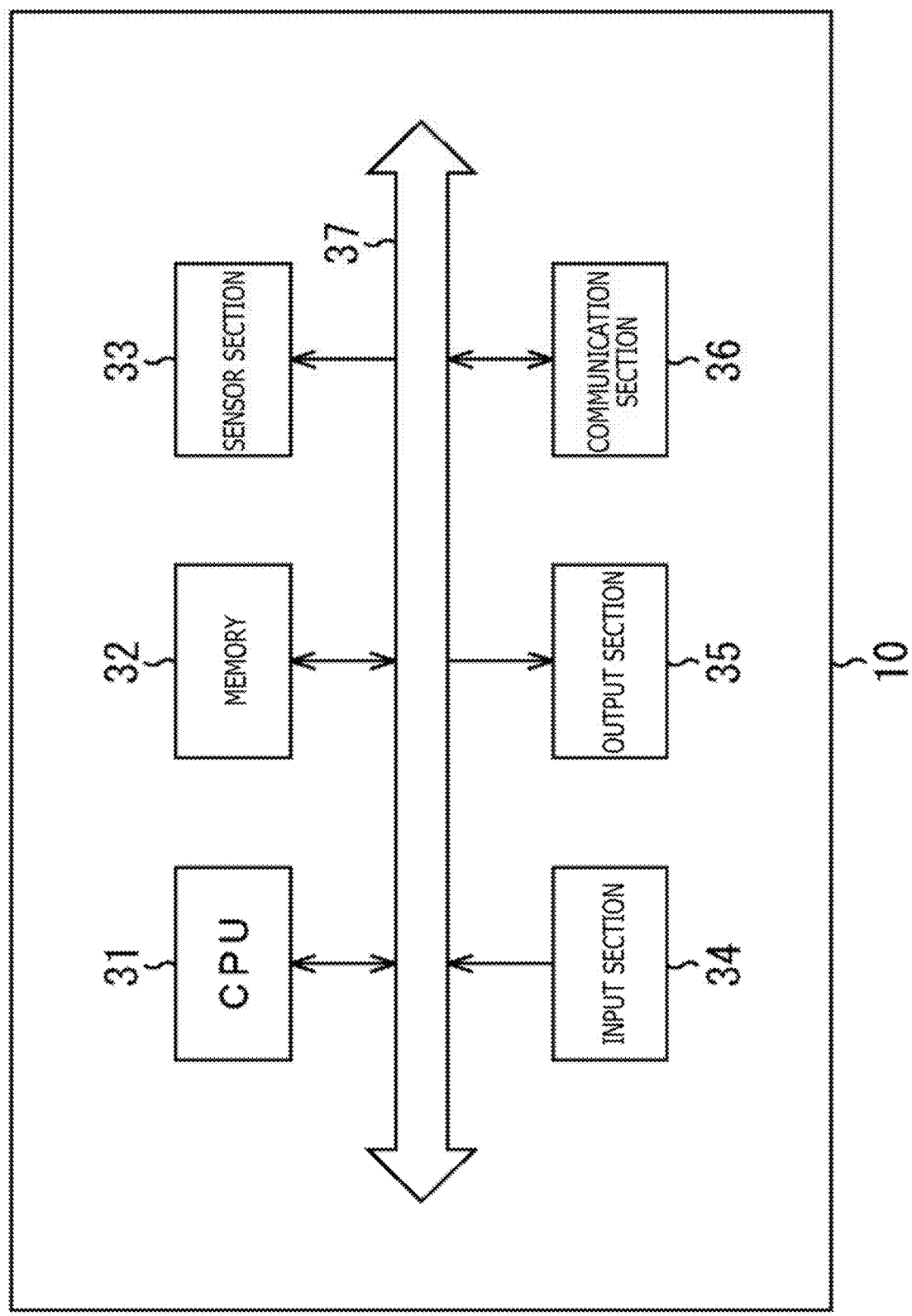
FIG. 2 is a block diagram depicting a configuration example of the AR-HMD as an information processing device.

FIG. 2 is a block diagram depicting a configuration example of the AR-HMD 10 as an information processing device.

The AR-HMD 10 in FIG. 2 includes a CPU (Central Processor Unit) 31, a memory 32, a sensor section 33, an input section 34, an output section 35, and a communication section 36, which are mutually connected via a bus 37.

The CPU 31 executes a process for implementing various types of functions included in the AR-HMD 10, in accordance with a program or data stored in the memory 32.

The memory 32 includes a storage medium such as a semiconductor memory or a hard disk, and stores a program or data for use in the process which is executed by the CPU 31.

The sensor section 33 includes various types of sensors including a microphone, a gyro sensor, and an acceleration sensor, in addition to the camera 12 in FIG. 1. Various types of sensor information acquired by the sensor section 33 are also used in a process which is executed by the CPU 31.

The input section 34 includes a button, a key, a touch panel, and the like. The output section 35 includes the display sections 11 in FIG. 1, a loudspeaker, and the like. The communication section 36 is formed as a communication interface for relaying various types of communication.

Functional Configuration Example of AR-HMD

Figure 3:
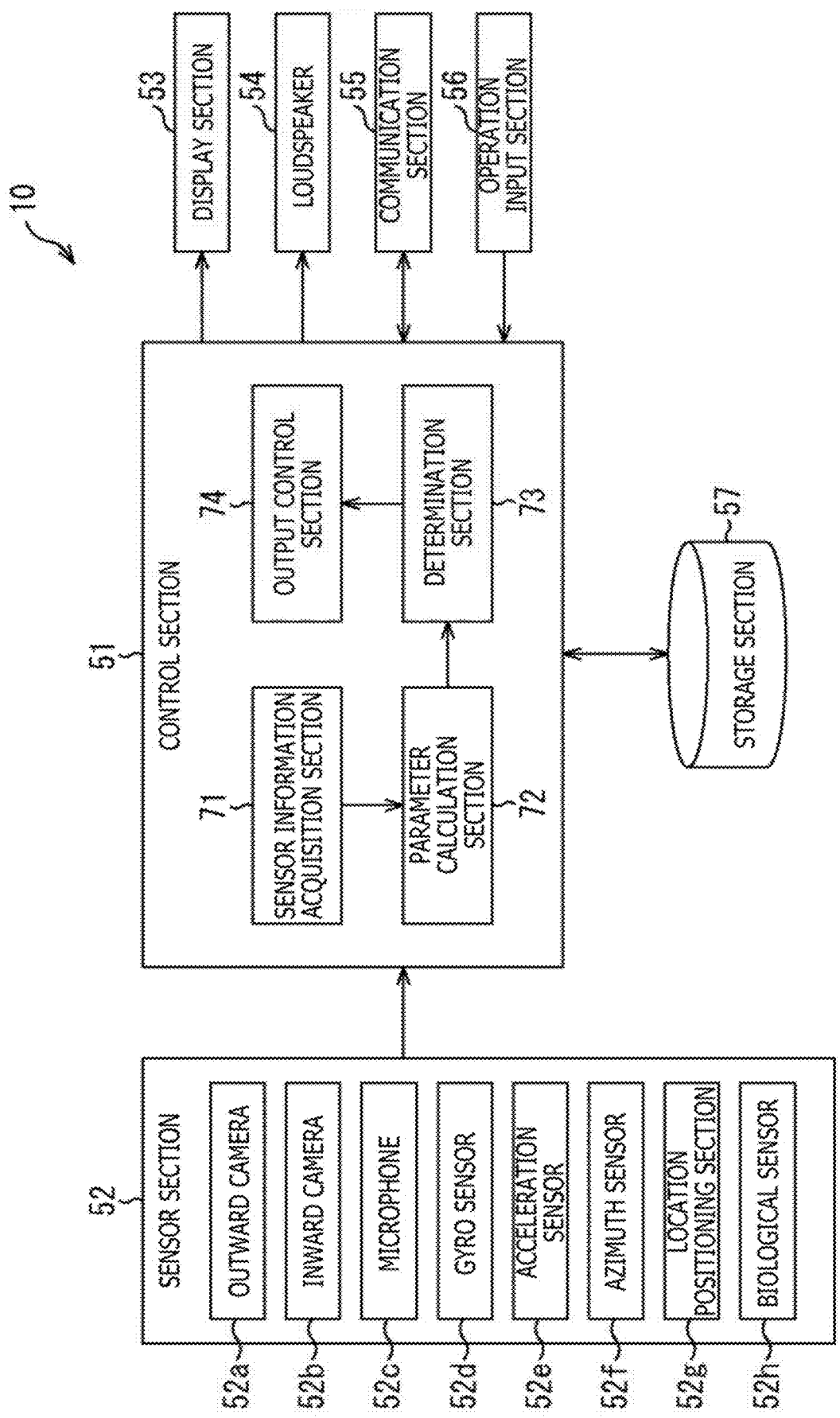
FIG. 3 is a block diagram depicting a functional configuration example of the AR-HMD.

FIG. 3 is a block diagram depicting a functional configuration example of the AR-HMD 10 to which the technique according to the present disclosure has been applied.

The AR-HMD 10 in FIG. 3 includes a control section 51, a sensor section 52, a display section 53, a loudspeaker 54, a communication section 55, an operation input section 56, and a storage section 57.

The control section 51 corresponds to the CPU 31 in FIG. 2, and executes a process for implementing various types of functions included in the AR-HMD 10.

The sensor section 52 corresponds to the sensor section 33 in FIG. 2, and includes various types of sensors.

Specifically, the sensor section 52 includes an outward camera 52a that corresponds to the camera 12 in FIG. 1, an inward camera 52b that captures an image of a user who is wearing the AR-HMD 10, and a microphone 52c that collects sounds in the surrounding area of the AR-HMD 10. In particular, with the inward camera 52b, a visual line of the user can be detected.

Further, the sensor section 52 includes a gyro sensor 52d that detects the angle (attitude) or angular velocity of the AR-HMD 10, an acceleration sensor 52e that detects the acceleration of the AR-HMD 10, and an azimuth sensor 52f that detects the bearing of the AR-HMD 10. These sensors may be separately configured, or may be integrally configured.

Moreover, the sensor section 52 includes a location positioning section 52g for positioning a location through a satellite positioning system such as a GPS (Global Positioning System) system, and a biological sensor 52h that acquires biological information (heart rate, body temperature, brain waves, etc.) regarding the user who is wearing the AR-HMD 10.

Various types of sensor information acquired by these sensors are used in a process which is executed by the control section 51.

The display section 53 corresponds to the display section 11 in FIG. 1, and carries out annotation display under control of the control section 51, or displays an image acquired by the outward camera 52a.

The loudspeaker 54 serves as a sound source of a sound to be outputted to the user, and outputs a sound under control of the control section 51.

The communication section 55 corresponds to the communication section 36 in FIG. 2, and performs various types of communication with another device.

The operation input section 56 corresponds to the input section 34 in FIG. 2, and receives a user's operation input performed on the AR-HMD 10.

On the basis of user action information (hereinafter, also simply referred to as action information) indicating a user's action and the position relationship between a display region of the display section 53 of the AR-HMD 10 and a real object or virtual object which is disposed in a three-dimensional space, the control section 51 controls an output associated with the real object or virtual object. Here, the three-dimensional space may be a real space, or may be a virtual space.

Specifically, by executing a predetermined program, the control section 51 implements a sensor information acquisition section 71, a parameter calculation section 72, a determination section 73, and an output control section 74.

The sensor information acquisition section 71 acquires sensor information from the sensor section 52, and acquires user action information indicating an action of the user wearing the AR-HMD 10 on the basis of the sensor information. The user action information includes dynamic information regarding actions of the user's entire body or each site thereof, movement of the visual line (change in the visual line position) of the user, a change in the distance between the user and the object, or the like. Further, the sensor information acquisition section 71 acquires user position/attitude information (hereinafter, also simply referred to as position/attitude information) indicating the position or the attitude of the user wearing the AR-HMD 10 on the basis of the sensor information acquired from the sensor section 52. The user position/attitude information includes static information regarding the attitude or the position of the user, the distance between the user and the object, or the like.

The parameter calculation section 72 calculates a parameter representing a user's action, position, status, or the like on the basis of the sensor information acquired by the sensor information acquisition section 71, or specifically, the user action information and the user position/attitude information acquired from the sensor information.

The determination section 73 determines an output format of an output regarding an object that is not displayed in the display region of the display section 53 (object that is in a non-displayed state) on the basis of the parameter calculated by the parameter calculation section 72.

The output control section 74 controls the output regarding the object that is in the non-displayed state in the display region of the display section 53, in accordance with the output format determined by the determination section 73. Note that the output regarding the object that is in the non-displayed state may be provided through indications or sounds.

With this configuration, information can be presented to a user in a more easy-to-understand manner according to various types of situations such as a user's action, position, status, or the like.

Hereinafter, embodiments of the aforementioned AR-HMD 10 will be specifically explained.

2. First Embodiment

In general, in an AR-HMD that presents information in a space surrounding a user, a displayed angular field of a display is limited, so that the displayed angular field of the display has a tendency to become relatively narrower than the visual field of the user. For this reason, a virtual object (annotation) can be displayed in only a part of the visual field of the user. Accordingly, an overview of presented information is difficult to grasp in some cases.

Figure 4:
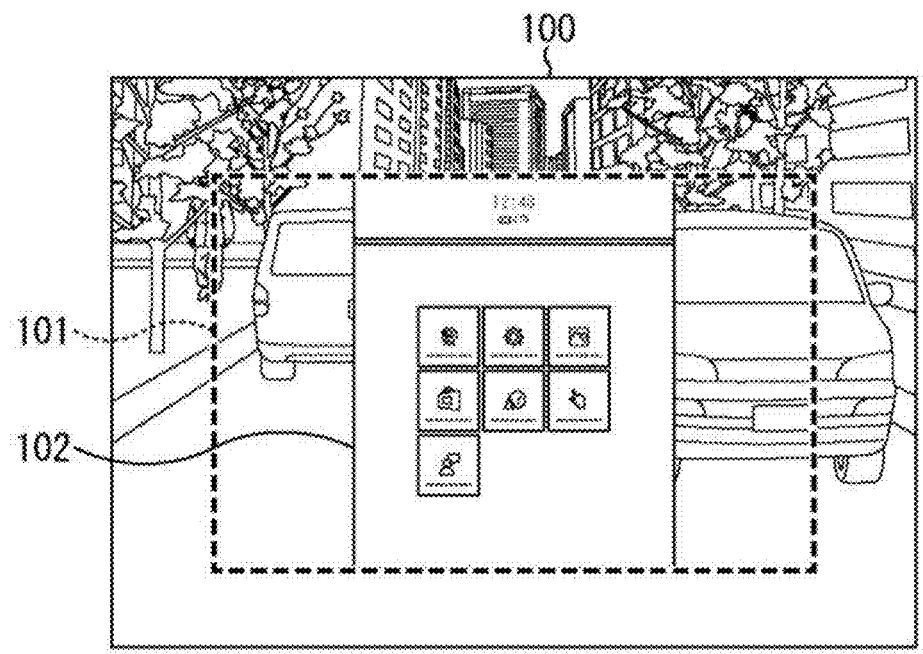
FIG. 4 is a diagram for explaining limitations on a display region of the AR-HMD.

FIG. 4 depicts one example of a scheme for grasping an overview of information presented by a general AR-HMD. In the example in FIG. 4, a virtual object (menu list) 102 is displayed by being resized so as to be included in a displayed angular field 101 of a display, in a real space 100 which is included in the visual field of a user.

However, when a virtual object displayed within the displayed angular field 101 is evenly resized as depicted in FIG. 4, the visibility of the displayed details thereof may be deteriorated or the operability may be worsened.

Therefore, the present embodiment switches an information display layout in accordance with a user's action such as a change in the distance between the user and a virtual object to be operated.

For example, in a case where a menu list is displayed and the menu list is viewed by a user at a short distance, items are displayed in a certain size and a certain interval such that the items are operable, or character strings describing the respective items in detail are displayed in a visible character size. In a case where the menu list is viewed by a user having stepped back, the items are displayed in a certain size and a certain interval such that the overall menu list can be grasped, or only brief descriptions of the respective items are displayed in a visible character size.

Functional Configuration Example of AR-HMD

Figure 5:
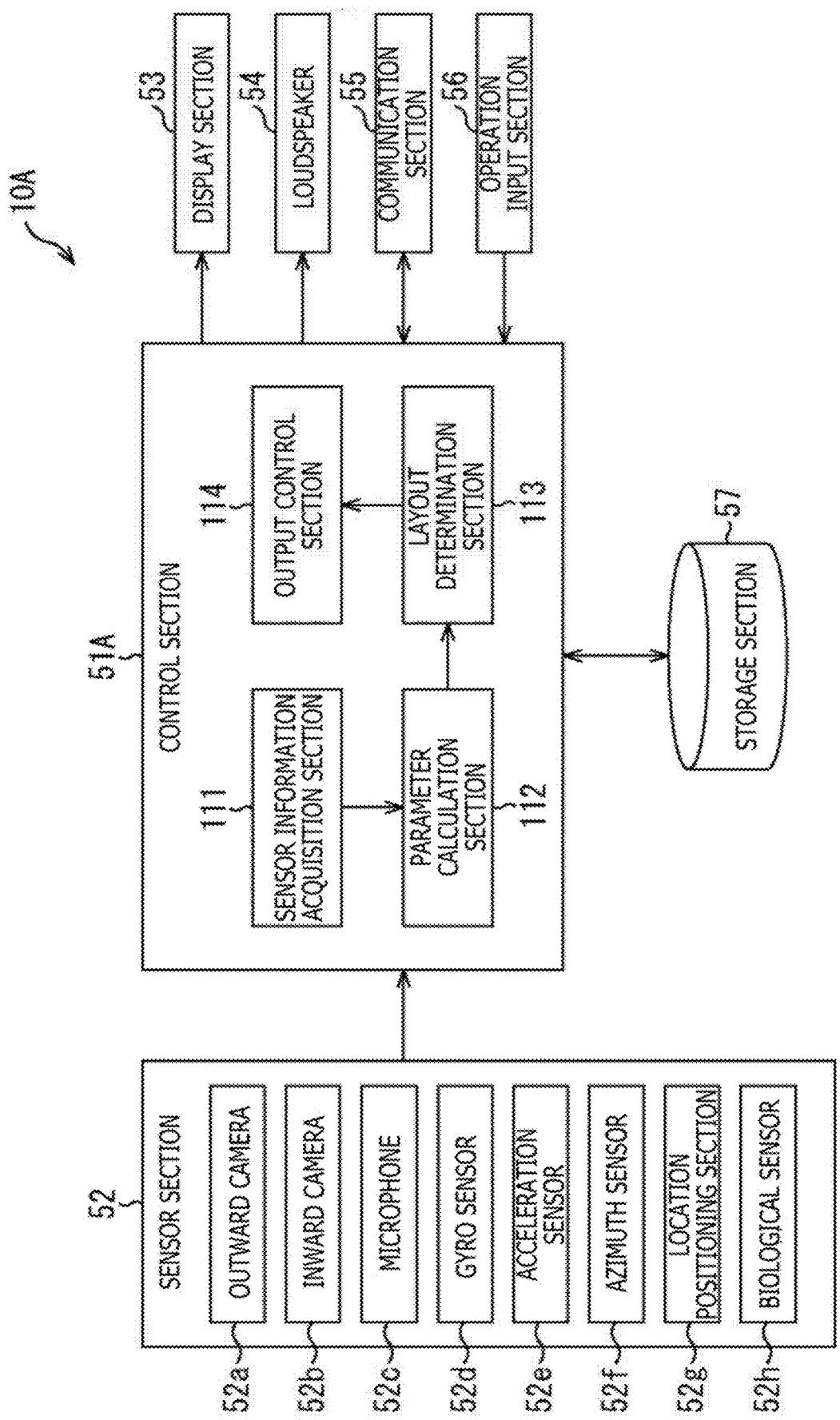
FIG. 5 is a block diagram depicting a functional configuration example of the AR-HMD according to the first embodiment.

FIG. 5 is a block diagram depicting a functional configuration example of an AR-HMD 10A according to the present embodiment.

Note that the AR-HMD 10A in FIG. 5 differs from the AR-HMD 10 in FIG. 3 in that the AR-HMD 10A is provided with a control section 51A in place of the control section 51.

On the basis of the position relationship between a display region of the display section 53 of the AR-HMD 10A and a virtual object which is displayed in the display region, and on the basis of at least any one of user action information indicating a user's action or user position/attitude information, the control section 51A moves the virtual object located outside the display region of the display section 53, into the display region.

Specifically, the control section 51A implements a sensor information acquisition section 111, a parameter calculation section 112, a layout determination section 113, and an output control section 114.

The sensor information acquisition section 111 acquires the action information indicating an action of the user wearing the AR-HMD 10A and the position/attitude information on the basis of sensor information acquired from the sensor section 52.

The parameter calculation section 112 calculates a parameter representing a user's action, position, status, or the like, on the basis of the action information and the position/attitude information acquired by the sensor information acquisition section 111.

On the basis of the parameter calculated by the parameter calculation section 112, the layout determination section 113 determines a display layout of a virtual object (hereinafter, referred to as content) which is displayed in the display region of the display section 53.

The output control section 114 displays, in the display region of the display section 53, the content in the display layout determined by the layout determination section 113.

(Content Display Process)

Figure 6:
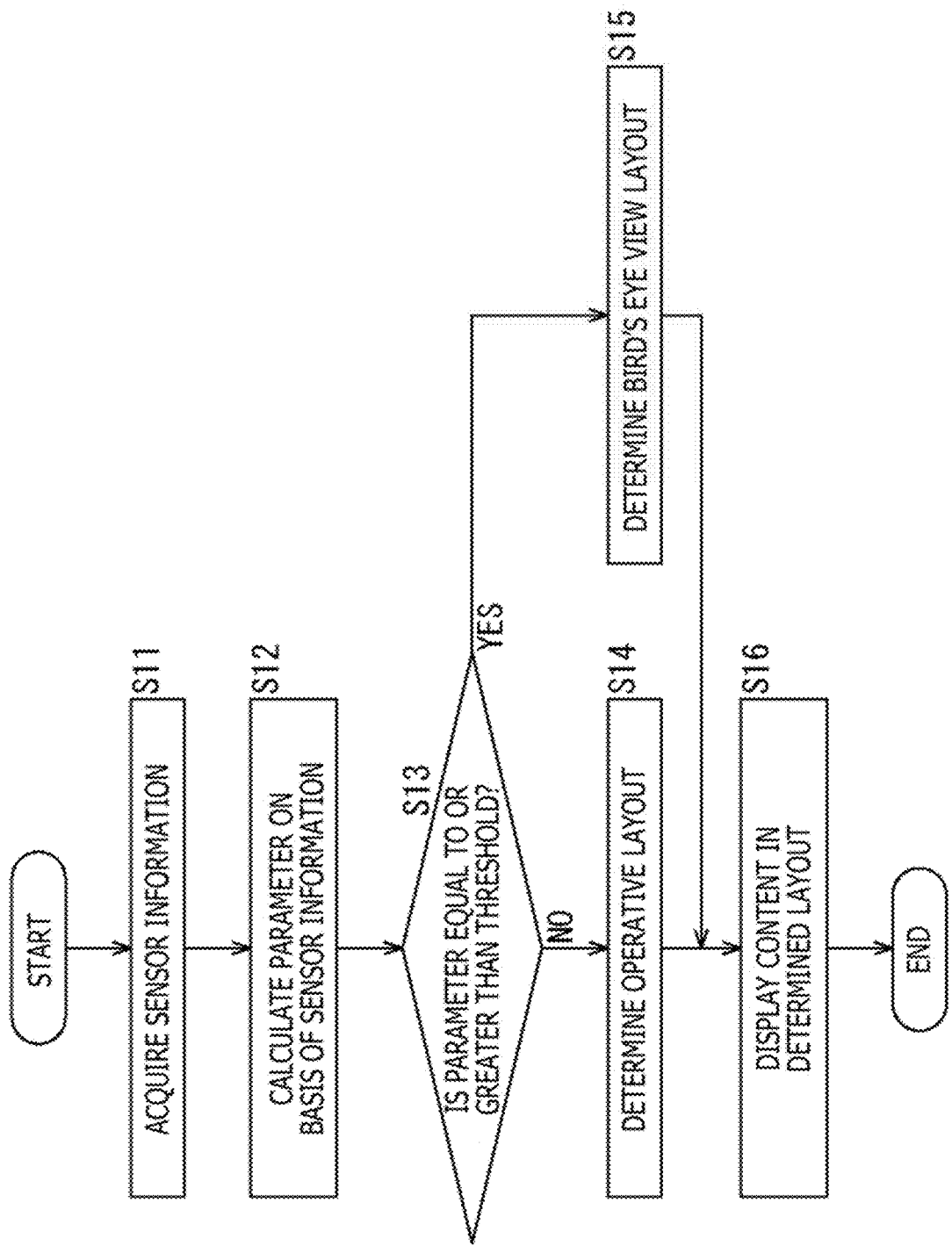
FIG. 6 is a flowchart for explaining a content display process.

Next, a content display process in the AR-HMD 10A will be explained with reference to a flowchart in FIG. 6.

In step S11, the sensor information acquisition section 111 acquires sensor information from the sensor section 52.

In step S12, on the basis of the sensor information, the parameter calculation section 112 calculates a parameter representing the distance between the user (specifically, the head part corresponding to the user's eye position) and content which is displayed in the display region of the display section 53.

In step S13, the layout determination section 113 determines whether or not the calculated parameter is equal to or greater than a predetermined threshold.

In a case where the parameter is determined not to be equal to or greater than the predetermined threshold in step S13, in other words, in a case where the distance between the user and the content is shorter than a predetermined distance, the process proceeds to step S14.

In step S14, the layout determination section 113 determines an operative layout as the display layout of the content which is displayed in the display region on the display section 53.

On the other hand, in a case where the parameter is determined to be equal to or greater than the predetermined threshold in step S13, in other words, in a case where the distance between the user and the content is longer than the predetermined distance, the process proceeds to step S15.

In step S15, the layout determination section 113 determines a bird's eye view layout as the display layout of the content which is displayed in the display region on the display section 53.

After step S14 or step S15, the process proceeds to step S16, and the output control section 114 displays the content in the determined display layout in the display region on the display section 53.

Figure 7C:
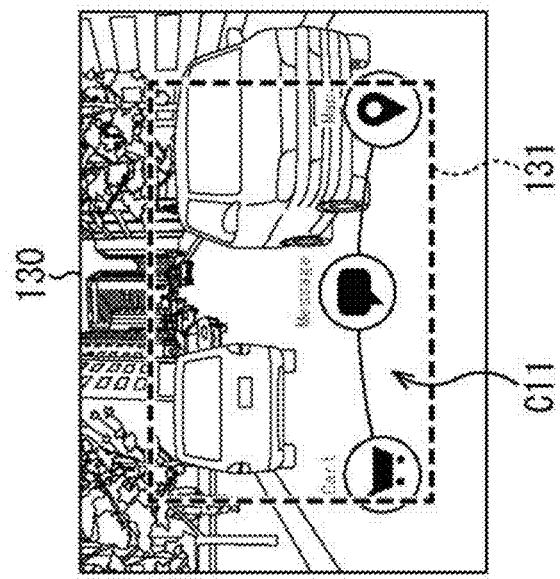
FIGS. 7A, 7B, and 7C depict diagrams for explaining an operative layout.
Figure 7B:
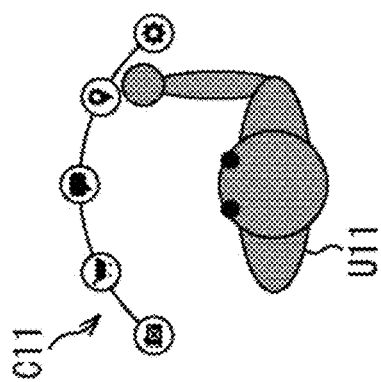
Figure 7A:
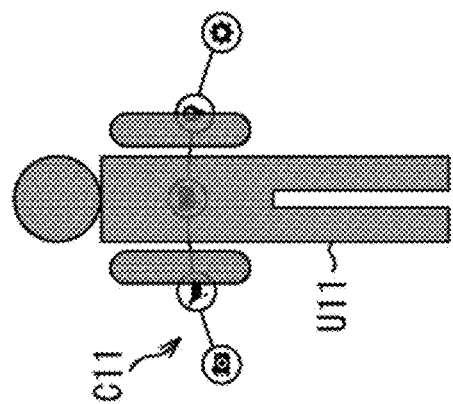

FIGS. 7A, 7B, and 7C depict diagrams for explaining the operative layout.

FIG. 7A depicts content C11 which is to be operated, when viewed from the rear side of a user U11. FIG. 7B depicts the content C11 when viewed from above the user U11. FIGS. 7A and 7B each depict a state where the user U11 is viewing the content C11 at a short distance.

The content C11 indicates a menu including five menu icons (hereinafter, simply referred to as icons) arranged at a predetermined interval. The icons correspond to items of the menu.

In the example in FIGS. 7A, 7B, and 7C, the icons of the content C11 are arranged at a certain wide interval so as to prevent an erroneous operation or erroneous recognition from being generated during a user's selection operation.

For example, in a case where the content C11 is operated by a hand, the interval between the icons is set to 20 cm or longer in view of the width of a palm (approximately 15 cm) in order to prevent unintended selection of a next icon. Also, in a case where the content C11 is operated by a visual line, the interval between the icons is set in view of an error in detection of the visual line. For example, in a case where an error in detection of the visual line is X(°) and the distance to the content is N, it is sufficient that the interval between the icons is set to N tan(X) or greater.

Accordingly, as depicted in FIG. 7C, only three icons out of the five icons of the content C11 are displayed in a displayed angular field 131 of the display section 53, in a real space 130 which is included in the visual field of the user. In an example in FIG. 7C, character strings (Cart, Message, Map) respectively describing the three icons in detail are displayed in a visible size.

FIGS. 8A, 8B, and 8C depict diagrams for explaining the bird's eye view layout.

FIG. 8A depicts the content C11 when viewed from behind the user U11. FIG. 8B depicts the content C11 when viewed from above the user U11. FIGS. 8A and 8B each depict a state where the user U11 having stepped back is viewing the content C11.

In the example in FIGS. 8A, 8B, and 8C, the icons of the content C11 are arranged at a certain narrow interval such that many items (icons) can be included in the displayed angular field of the display section 53.

Accordingly, as depicted in FIG. 8C, the five icons of the content C11 are all displayed in the displayed angular field 131 of the display section 53, in the real space 130 which is included in the visual field of the user. In an example in FIG. 8C, only the icons are displayed while no character strings for describing the respective icons in detail are displayed. Note that, in FIG. 8C, not only the interval between the icons but also the respective sizes of the icons are reduced, compared to the example in FIG. 7C.

According to the aforementioned process, the content display layout is switched in accordance with a change in the distance between the user and the content being displayed in the display region of the display section 53. Therefore, the user can operate the content or confirm the details thereof, and can grasp the content entirely, without feeling any burden.

In particular, when the user has stepped back with respect to the content, content located outside the display region is moved to be displayed in the display region. Therefore, information can be presented to the user in a more easy-to-understand manner.

Note that, as described above, FIG. 8B depicts an example in which, when the user U11 has stepped back, the virtual distance between the user's head (the visual point of the user U11 or the AR-HMD 10A) and the content C11 (icons) is changed, and the content C11 is displayed in the bird's eye view layout. In a case where, from this state, the user U11 approaches the content C11, the virtual distance between the visual point of the user U11 and the content C11 is reduced, so that the content C11 can be displayed in the operative layout.

Also, in each of the examples in FIGS. 7A, 7B, 7C, 8A, 8B, and 8C, the icons of the content C11 may move within a predetermined range in the front-rear direction when viewed from the user U11. Specifically, an upper limit value and a lower limit value are set for the distance between the icons and the user U11. The upper limit value is set to a distance at which all the icons of the content C11 can be visually recognized when the user U11 has stepped back. Further, the lower limit value is set to a distance at which a hand of the user U11 can naturally reach the icons of the content C11.

With this configuration, the virtual distance to the icons changes in the front-rear direction in accordance with whether the icons are in the operative layout or in the bird's eye view layout, but the icons can move while following the user U11, as appropriate, in accordance with movement of the user U11. Therefore, the user U11 can move, together with the icons, to a desired position in a real space, and switching between the operative layout and the bird's eye view layout can be performed by a natural action which is movement in the front-rear direction. Note that, in a case where the moving speed of the user U11 is equal to or greater than a predetermined value, some or all of the icons are set to a non-displayed state, irrespective of a result of determination on whether to perform switching to the operative layout or the bird's eye view layout, so that the visual field of the user U11 may be ensured.

Examples of User's Action

In the aforementioned examples, the distance between a user's head and content is used as a user's action which is a trigger for switching a content display layout. However, other information may be used therefor.

For example, the content display layout may be switched on the basis of the distance between a user's palm (hand) and content.

Figure 9B:
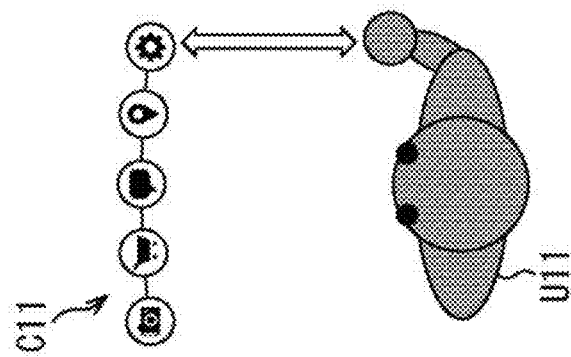
FIGS. 9A and 9B depict diagrams for explaining an example of a user's action.
Figure 9A:
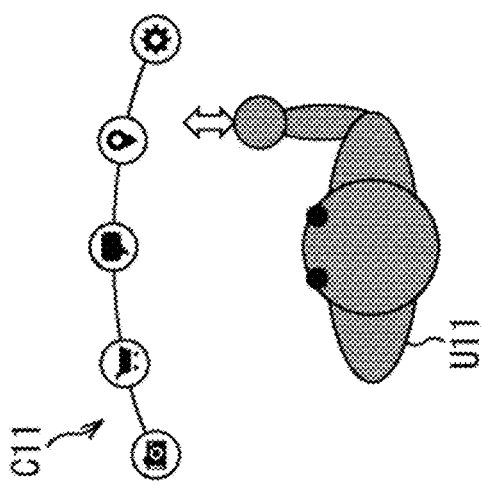

Specifically, in a case where a palm of the user U11 approaches the content C11 or is held in front of the content C11 as depicted in A of FIG. 9A, the content C11 is displayed in the operative layout. On the other hand, in a case where a palm of the user U11 is moved away from the content C11 or is moved down as depicted in FIG. 9B, the content C11 is displayed in the bird's eye view layout.

Further, in a case where a sensor for detecting a palm of the user U11 is provided to the AR-HMD 10A, the content C11 may be displayed in the operative layout when a palm of the user U11 enters the detection range of the sensor and is detected. As the sensor for detecting a palm, a stereo camera, a ToF (Time of Flight) type ranging sensor (IR sensor), or the like can be used, for example.

Moreover, in this configuration, the display layout of the content C11 may be changed in a case where the distance between the palm of the user U11 and the content C11 is changed, while the distance, in the front-rear direction, between the head of the user U11 and the content C11 may be substantially fixed even in a case where the head position of the user U11 is moved. Accordingly, the icons can be more naturally presented to the user U11 when the user U11 operates the icons by using hand gestures, for example.

Also, in a case where the gazing direction of the user U11 is detected with a sensor provided to the AR-HMD 10A, the content C11 may be displayed in the operative layout such that an icon being gazed at is located in the center position. With this configuration, the user U11 can intuitively perform switching between the operative layout and the bird's eye view layout.

In addition, the content display layout may be switched on the basis of a change in the user's visual line position with respect to content displayed in the display region of the display section 53.

Figure 10B:
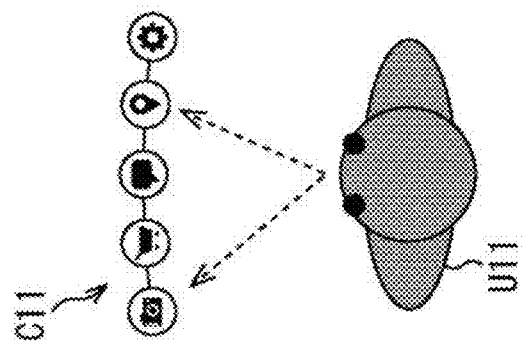
FIGS. 10A and 10B depict diagrams for explaining an example of a user's action.
Figure 10A:
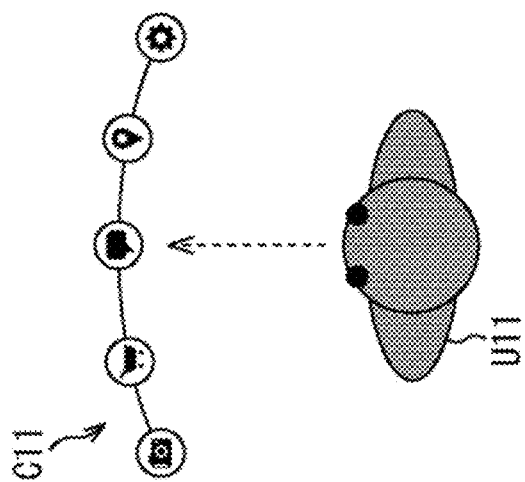

Specifically, in a case where the user U11 is gazing at a specific item (icon) of the content C11 without moving the visual line as depicted in FIG. 10A, the content C11 is displayed in the operative layout. On the other hand, in a case where the user U11 is constantly moving the visual line to look over multiple icons of the content C11 as depicted in FIG. 10B or the visual line is directed to something other than the icons, the content C11 is displayed in the bird's eye view layout.

Examples of Content Display Layout

In the aforementioned examples, the interval between the icons of content is mainly changed in accordance with whether the content is in the operative layout or in the bird's eye view layout. However, other elements may be changed.

For example, the size of each icon of the content may be changed in accordance with whether the content is in the operative layout or in the bird's eye view layout.

Figure 11B:
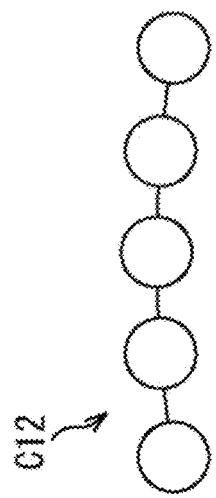
FIGS. 11A and 11B depict diagrams for explaining an example of a content display layout.
Figure 11A:
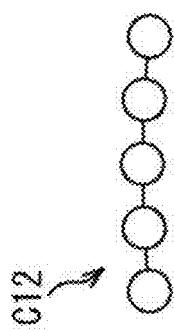

Specifically, in the operative layout, the size of each icon of content C12 is set to be large at a certain level, as depicted in FIG. 11A, such that any erroneous operation or erroneous recognition is prevented from being generated during a user's selective operation.

For example, in a case where the content C12 is operated by a hand, the width of each icon is set to 20 cm or greater in view of the width of a palm (approximately 15 cm) in order to prevent unintended selection of a next icon. Also, in a case where the content C12 is operated by a visual line, the width of each icon is set in view of an error in detection of the visual line. For example, in the case where an error in detection of the visual line is X(°) and the distance to the content is N, it is sufficient that the width of each icon is set to N tan(X) or greater.

On the other hand, in the bird's eye view layout, the size of each icon of the content C12 is set to be small at a certain level, as depicted in FIG. 11B, such that many items (icons) can be included within the displayed angular field of the display section 53.

Alternatively, icon arrangement in content may be changed in accordance with whether the content is in the operative layout or in the bird's eye view layout.

Figure 12B:
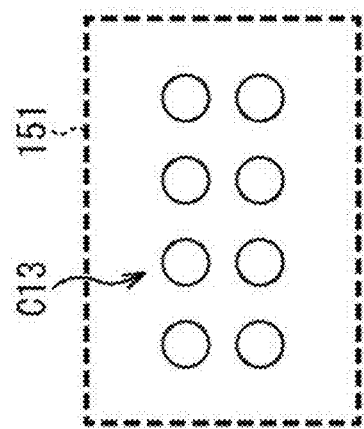
FIGS. 12A and 12B depict diagrams for explaining an example of a content display layout.
Figure 12A:
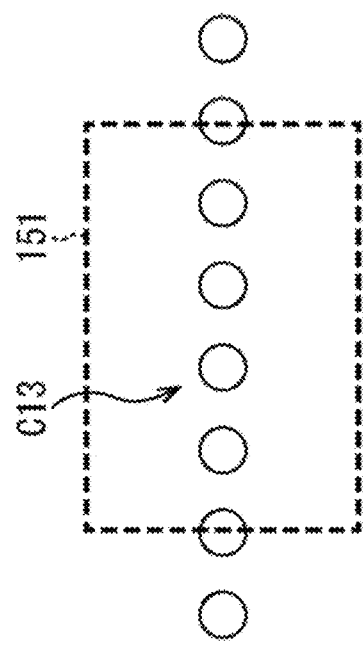

Specifically, in the operative layout, icons of content C13 are horizontally arranged in a line, as depicted in FIG. 12A, such that a user can separately select the items with ease. In this case, some of the icons may be located outside a displayed angular field 151 of the display section 53.

On the other hand, in the bird's eye view layout, the icons of the content C13 are arranged in a matrix form as depicted in FIG. 12B, for example, such that as many items (icons) as possible are included within the displayed angular field 151 of the display section 53.

In addition, the number of icons of content may be changed in accordance with whether the content is in the operative layout or in the bird's eye view layout.

Specifically, in the operative layout, only three icons of content, that is, an icon being focused on and icons next thereto (for example, icons on the left and right sides of the focused icon) are displayed. On the other hand, in the bird's eye view layout, as many icons as possible are displayed within the displayed angular field of the display section 53.

Note that, in the present embodiment, the aforementioned user's actions and the aforementioned content display layouts may be implemented in an arbitrary combination.

3. Second Embodiment

In general, in an AR-HMD that presents information in a space surrounding a user, the displayed angular field of a display is limited, so that a virtual object (annotation) can be displayed in only a part of the visual field of the user in some cases.

Figure 13B:
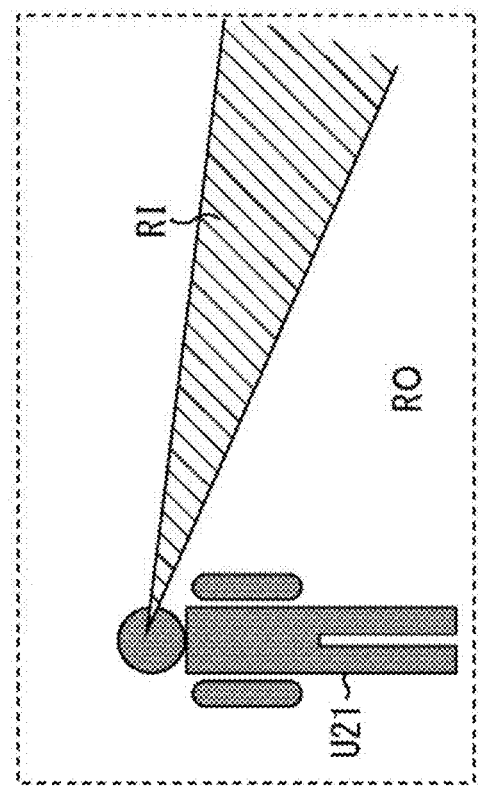
FIGS. 13A and 13B depict diagrams for explaining limitations on the display region of the AR-HMD.
Figure 13A:
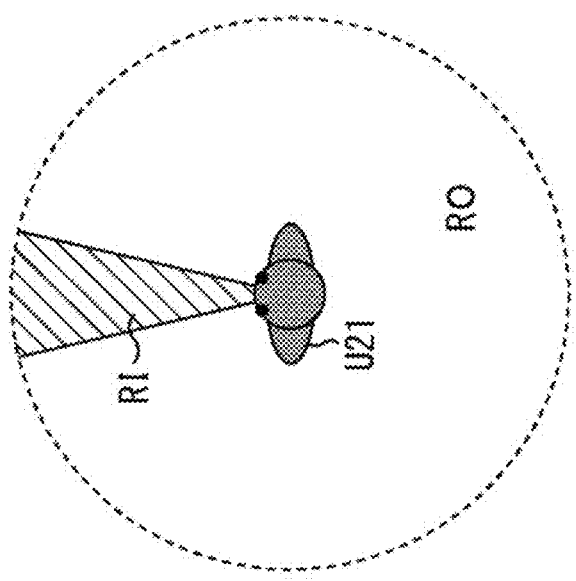

For example, in a display, a virtual object can be displayed only in a region RI corresponding to a partial angle in the 360° angle about a user U21 with respect to the visual field direction of the user U21, as depicted in FIG. 13A. Note that, as depicted ink FIG. 13B, the region RI is limited also with respect to the vertical direction of the visual field direction of the user U21.

For this reason, even when a virtual object exists in a region RO other than the region RI, the user U21 can miss or cannot find out the virtual object. Meanwhile, in a case where excessive feedback is outputted through a display or a sound in order to make it easy to find out such a virtual object, the feedback may inhibit an AR application experience itself, or may interrupt content viewing.

Therefore, the present embodiment switches a feedback output format regarding a virtual object to be presented, in accordance with a user's action such as the distance between the user and the virtual object.

For example, in a case where a user is at a position far away from a target (virtual object) which is desired to be presented to the user, a simple display indicating the position (direction) of the target is outputted as feedback. Then, in a case where the user has approached the target, a display for highlighting the target itself is outputted as feedback. Furthermore, in a case where the user has approached the target but does not gaze at the target, a sound indicating that the target is near the user is outputted as feedback.

Functional Configuration Example of AR-HMD

Figure 14:
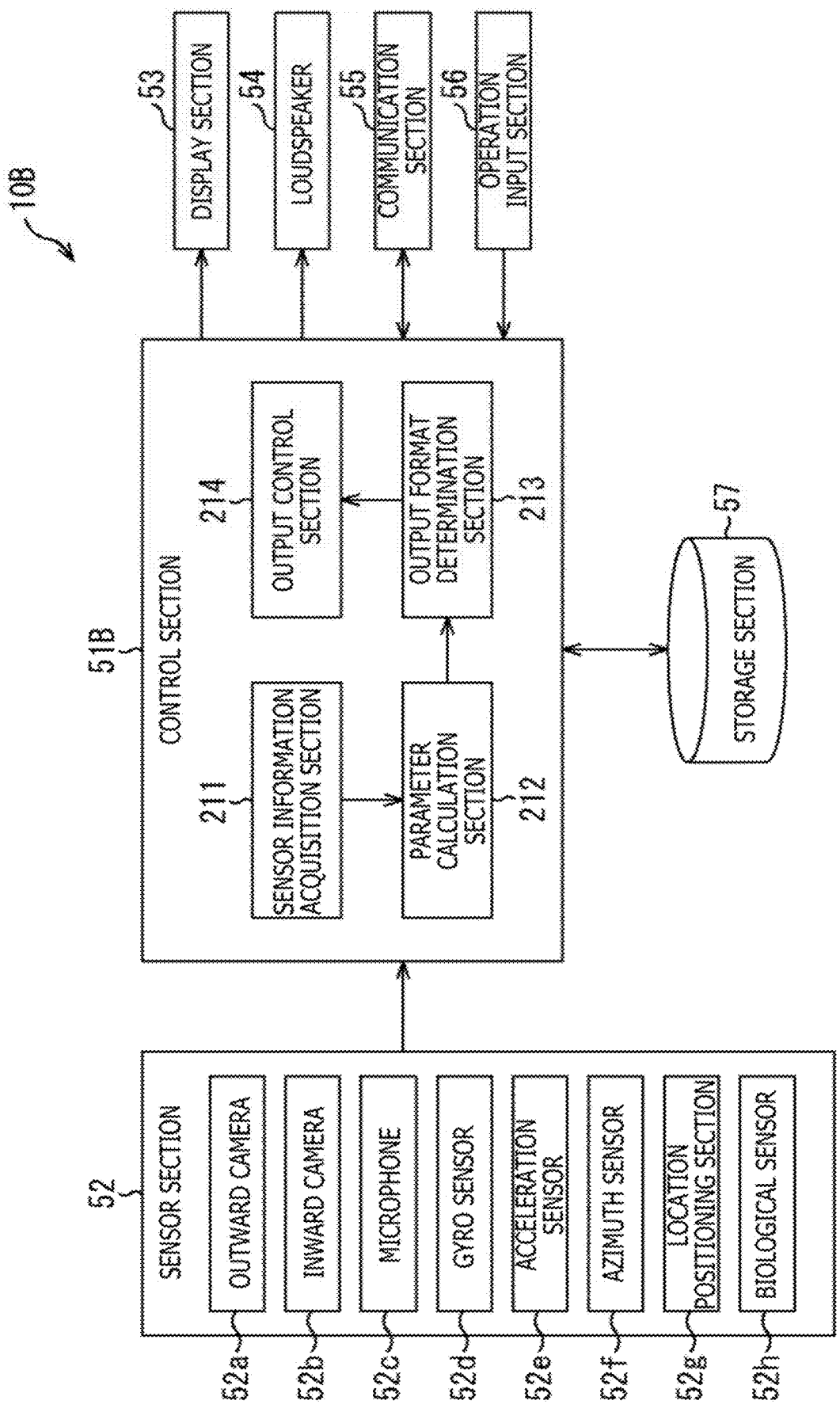
FIG. 14 is a block diagram depicting a functional configuration example of an AR-HMD according to a second embodiment.

FIG. 14 is a block diagram depicting a functional configuration example of an AR-HMD 10B according to the present embodiment.

Note that the AR-HMD 10B in FIG. 14 differs from the AR-HMD 10 in FIG. 3 in that the AR-HMD 10B is provided with a control section 51B in place of the control section 51.

The control section 51B causes a feedback output section (the display section 53 or the loudspeaker 54) to output feedback indicating the position of a virtual object located outside the display region of the display section 53 on the basis of the position relationship between the display region of the display section 53 of the AR-HMD 10B and the virtual object located outside the display region and on the basis of at least any one of user action information indicating a user's action or user position/attitude information.

Specifically, the control section 51B implements a sensor information acquisition section 211, a parameter calculation section 212, an output format determination section 213, and an output control section 214.

The sensor information acquisition section 211 acquires the action information indicating an action of the user wearing the AR-HMD 10B and the position/attitude information on the basis of sensor information acquired from the sensor section 52.

The parameter calculation section 212 calculates a parameter representing a user's action, position, status, or the like on the basis of the action information and the position/attitude information acquired by the sensor information acquisition section 211.

The output format determination section 213 determines a feedback output format regarding a virtual object (hereinafter, referred to as content) which is a target desired to be presented to the user, on the basis of the parameter calculated by the parameter calculation section 212.

The output control section 214 causes the display section 53 or the loudspeaker 54 to output feedback in the output format determined by the output format determination section 213.

(Feedback Output Process)

Figure 15:
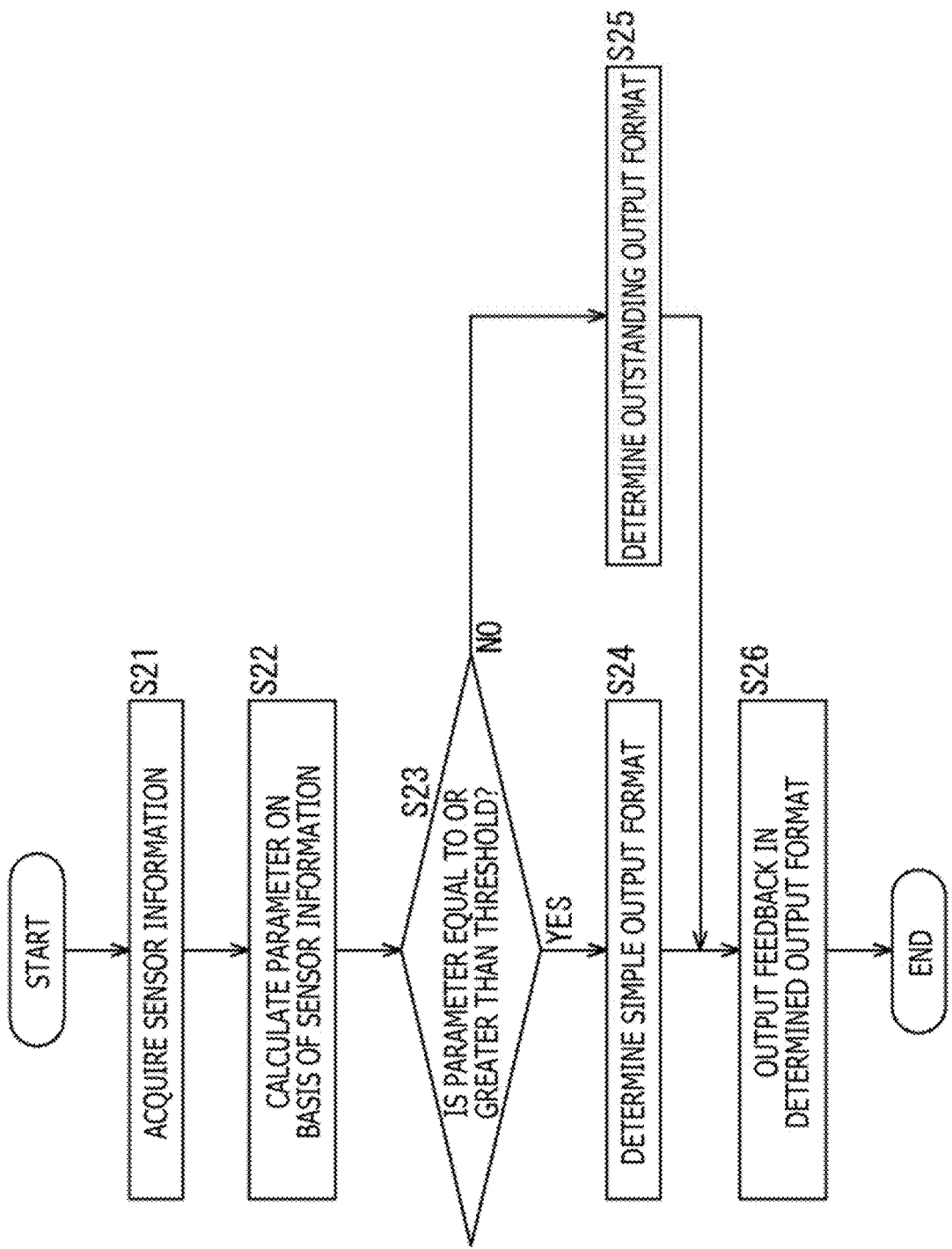
FIG. 15 is a flowchart for explaining a feedback output process.

Next, a feedback output process which is executed by the AR-HMD 10B will be explained with reference to a flowchart in FIG. 15.

In step S21, the sensor information acquisition section 211 acquires sensor information from the sensor section 52.

In step S22, the parameter calculation section 212 calculates a parameter representing the distance between the user and content (virtual object) which is desired to be presented to the user, on the basis of the sensor information.

In step S23, the output format determination section 213 determines whether or not the calculated parameter is equal to or greater than a predetermined threshold.

In a case where the parameter is determined to be equal to or greater than the predetermined threshold in step S23, in other words, in a case where the distance between the user and the content is longer than a predetermined distance, the process proceeds to step S24.

In step S24, the output format determination section 213 determines a simple output format as the feedback output format regarding the content which is desired to be presented to the user.

On the other hand, in a case where the parameter is determined not to be equal to or greater than the predetermined threshold in step S23, that is, in a case where the distance between the user and the content is shorter than the predetermined distance, the process proceeds to step S25.

In step S25, the output format determination section 213 determines an outstanding output format as the feedback output format regarding the content which is desired to be presented to the user.

After step S24 or step S25, the process proceeds to step S26, and the output control section 214 causes the display section 53 or the loudspeaker 54 to output feedback in the determined output format.

For example, in a case where the user U21 is at a position far away from content C21 which is desired to be presented to the user, or remains at a certain position as depicted in FIG. 16A, the display section 53 is caused to display feedback FB21 which is simple and has a small visual-field occupying area (drawing area) such that the visual field of the user U21 is not shielded and only minimum required information is provided. In the example in FIG. 16A, the feedback FB21 is displayed as a triangular arrow icon for indicating the position of the content C21.

On the other hand, in a case where the user U21 has approached the content C21 as depicted in FIG. 16B, the display section 53 is caused to display feedback FB22 for highlighting the content C21 (to increase the feedback output) such that the user U21 can more easily find out the content C21. In the example in FIG. 16B, the feedback FB22 is displayed as a highlight image for highlighting the periphery of the content C21. Accordingly, the content C21 can be easily found out, and further, the movement direction of the user U21 can be guided.

According to the aforementioned process, a feedback output format regarding content is switched in accordance with the distance between a user and the content, and thus, the feedback output is stepwise controlled in accordance with a change in the distance. Therefore, feedback can be presented to a user in a more appropriate output format while an AR application experience itself is not inhibited or viewing other virtual objects is not interrupted.

Examples of User's Action and Feedback

In the aforementioned examples, the feedback output format is switched in accordance with the distance between the user and the content. However, the feedback output format may be switched in accordance with other user's actions.

For example, the feedback output format may be switched (the feedback output may be stepwise controlled) in accordance with a seeking period of time, which is a period of time taken for a user to seek out a target (content which is desired to be presented to the user). Here, the seeking period of time may be included in action information.

Note that seeking out herein means an action that is determined, on the basis of a change in the position of the user or a gazing determination result based on the visual line, that the user is constantly moving around the target or that the user's visual line is moving around the target. In addition, in a case where gazing at the target is not determined for a certain period of time, it can be presumed that seeking out is continued.

Figure 17A:
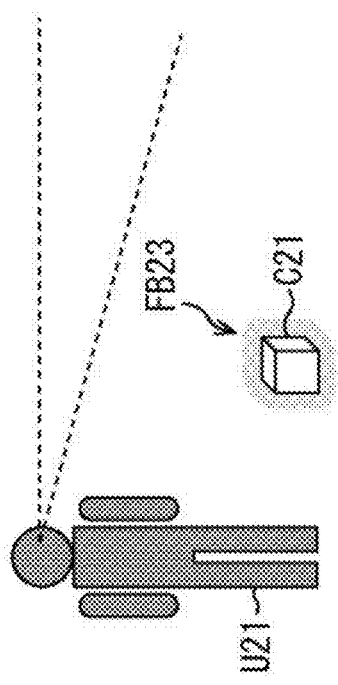
FIGS. 17A and 17B depict diagrams for explaining a user's action and a feedback output.

Specifically, immediately after the user U21 starts to seek out the content C21, the display section 53 is caused to display natural feedback FB23 which is adapted to the surrounding environment while highlighting the content C21, in order to make it easy to find out the content C21, as depicted in FIG. 17A. For example, the feedback FB23 is displayed as an image for indicating as if a shine is put or reflection light is applied onto the surface of the content C21.

Figure 17B:
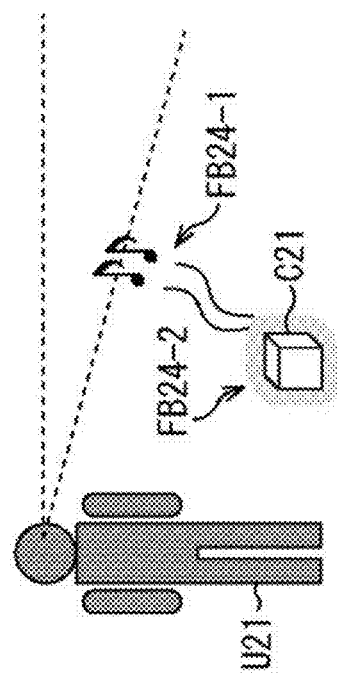

On the other hand, in a case where the user U21 continues seeking out the content C21 for a while, the loudspeaker 54 is caused to output, as feedback FB24-1, a notification sound that is different from the ambient sounds, or the display section 53 is caused to display, as feedback FB24-2, a highlight image for highlighting the periphery of the content C21, as depicted in FIG. 17B, in order to make it easier to find out the content C21. Alternatively, the feedback FB24-2 may be displayed as an animation in which the highlight image blinks, for example.

Further, the feedback output format may be switched in accordance with a period of time during which the user constantly gazes at the target.

Specifically, in a case where the user U21 finds out the content C21 and then starts gazing at the content C21, the display section 53 is caused to keep displaying feedback FB25 for highlighting the content C21, for example, as depicted in FIG. 18A, in a similar manner as that before the content C21 is found out.'

On the other hand, in a case where the user U21 is constantly gazing at the content C21 for a while, the display section 53 is caused to display feedback FB26 which is more moderate than the feedback FB25 as depicted in FIG. 18B, because the user U21 is considered to have already grasped the position or the details of the content C21. For example, the feedback FB26 is displayed as a highlight image having lighter color, a smaller size, and a narrower width than the feedback FB25. The color density, the size, and the width of the feedback FB26 is changed in accordance with a period of time during which the user U21 gazes at the content C21.

Furthermore, the feedback output format may be switched (the feedback output may be stepwise controlled) in accordance with a user's action.

Specifically, as depicted in FIG. 19A, while a speech spoken by the user U21 is being detected on the basis of information from the microphone 52c, the display section 53 is caused to display moderate feedback FB27 (the feedback output is reduced) so as not to inhibit the action (speech speaking) of the user U21.

On the other hand, when detection of the speech spoken by the user U21 is no longer detected, the loudspeaker 54 is caused to output, as feedback FB28-1, a notification sound for making the presence of the content C21 outstand, or the display section 53 is caused to display, as feedback FB28-2, a highlight image for highlighting the periphery of the content C21, as depicted in FIG. 19B. The feedback FB28-2 is displayed as a highlight image having a deeper color, a larger size, and a wider width than the feedback FB27. The feedback FB28-2 may be displayed as an animation in which the highlight image blinks, for example.

Also, in the example in FIGS. 19A and 19B, the feedback output format may be switched in accordance with, instead of the speaking status of the user, the motion amount of the user when the user stops walking to stand still or when the user stops looking around to face a specific direction, for example.

Note that, in the present embodiment, the aforementioned user's actions and feedback output formats may be implemented in an arbitrary combination.

Also, in the aforementioned examples, a target which is desired to be presented to the user is a virtual object. However, the target may be a real object that exists in a real space.

Note that the present embodiment may be combined with the first embodiment regarding the content (icon) layout display. In this case, while the icons of the content C11 are being gazed at, for example, the user can be presumed to be in a non-seeking state. With this configuration, a user's intention can be properly reflected in a feedback output.

4. Third Embodiment

In general, in an AR-use HMD or a VR (Virtual Reality)-use HMD that presents information in a real space or a virtual space surrounding a user, the displayed angular field of a display is limited, so that a virtual object (annotation) can be displayed only in a part of the visual field of the user.

For this reason, even when a notification sound is emitted from a virtual object which is desired to be presented to a user but is located outside a visible range (display region), the user cannot figure out where to look. In addition, even when a sound such as a systematic sound is stereophonically emitted from specific three-dimensional coordinates, the user cannot easily specify the position of the sound source.

Therefore, the present embodiment changes the output pattern of audio feedback regarding an indication (virtual object) which is desired to be presented to a user on the basis of the relative position relationship between the user and the indication.

For example, on the basis of the relative position relationship between a user and an indication which is desired to be presented to the user, a sound source configured to stereophonically output a feedback output is caused to present the feedback output while the coordinates of the sound source are being moved or the frequency thereof is being changed.

Functional Configuration Example of AR-HMD

Figure 20:
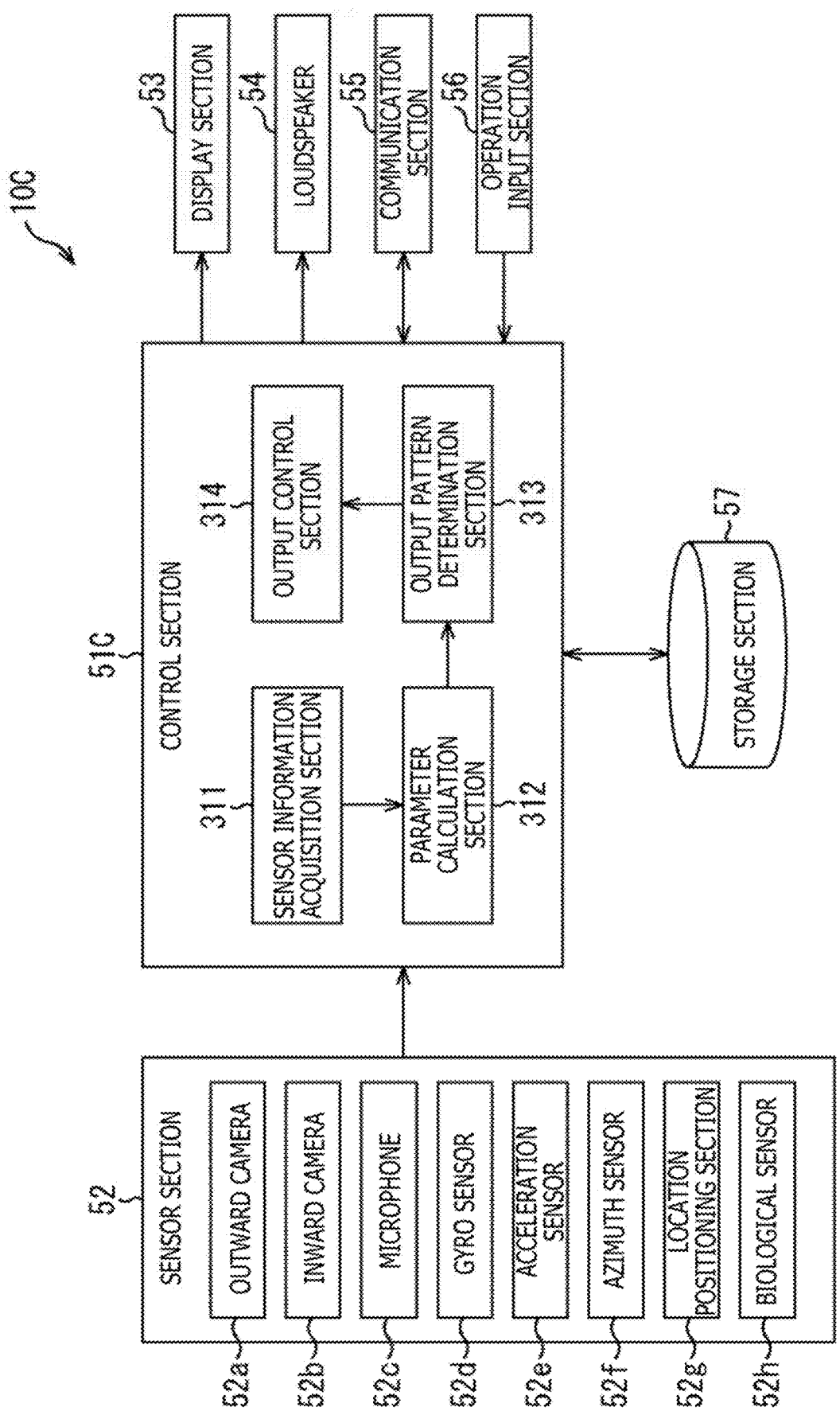
FIG. 20 is a block diagram depicting a functional configuration example of an AR-HMD according to a third embodiment.

FIG. 20 is a block diagram depicting a functional configuration example of an AR-HMD 10C according to the present embodiment.

Note that the AR-HMD 10C in FIG. 20 differs from the AR-HMD 10 in FIG. 3 in that the AR-HMD 10C is provided with a control section 51C in place of the control section 51.

The control section 51C causes a feedback output section to output feedback indicating the position of a virtual object located outside the display region of the display section 53 on the basis of the position relationship between the display region of the display section 53 of the AR-HMD 10C and the virtual object located outside the display region, and on the basis of at least any one of user action information indicating a user's action or user position/attitude information. Note that, in the present embodiment, the user position/attitude information is mainly referred to rather than the user action information is.

Specifically, the control section 51C implements a sensor information acquisition section 311, a parameter calculation section 312, an output pattern determination section 313, and an output control section 314.

The sensor information acquisition section 311 acquires action information indicating an action of the user wearing the AR-HMD 10C and position/attitude information on the basis of sensor information acquired from the sensor section 52.

The parameter calculation section 312 calculates a parameter representing a user's action, position, status, or the like on the basis of the action information and the position/attitude information acquired by the sensor information acquisition section 311.

The output pattern determination section 313 determines an output pattern of audio feedback regarding an indication which is desired to be presented to the user, on the basis of the parameter calculated by the parameter calculation section 312.

The output control section 314 causes the loudspeaker 54 to output feedback in the output pattern determined by the output pattern determination section 313.

(Feedback Output Process)

Figure 21:
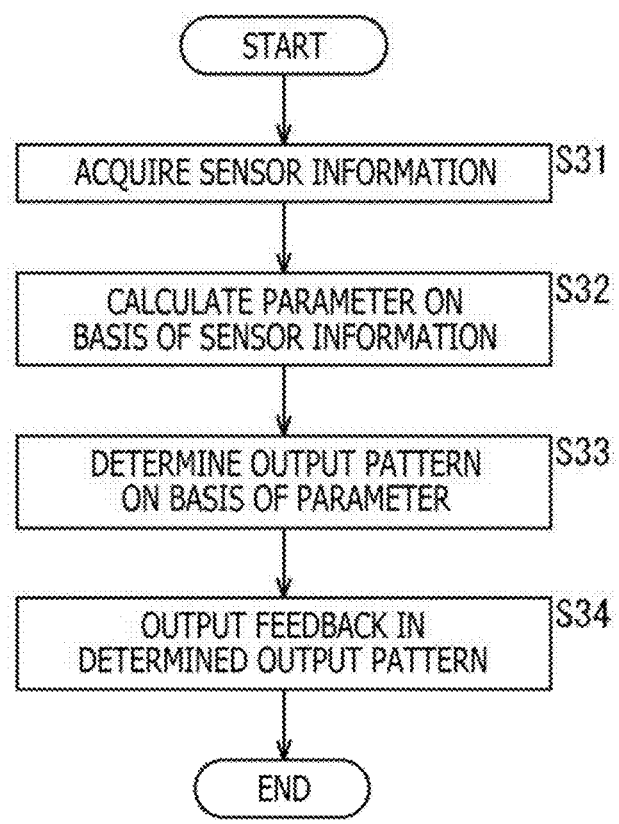
FIG. 21 is a flowchart for explaining a feedback output process.

Next, a feedback output process which is executed by the AR-HMD 10C will be explained with reference to a flowchart in FIG. 21.

In step S31, the sensor information acquisition section 311 acquires sensor information from the sensor section 52.

In step S32, the parameter calculation section 312 calculates a parameter representing the relative position relationship between the user and an indication (virtual object) which is desired to be presented to the user, mainly on the basis of position/attitude information included in the sensor information.

In step S33, the output pattern determination section 313 determines the output pattern of audio feedback regarding the indication which is desired to be presented to the user, on the basis of the calculated parameter, in other words, on the basis of the relative position relationship between the user and the indication.

Next, in step S34, the output control section 314 causes the loudspeaker 54 to output the feedback in the determined output pattern.

Figure 22B:
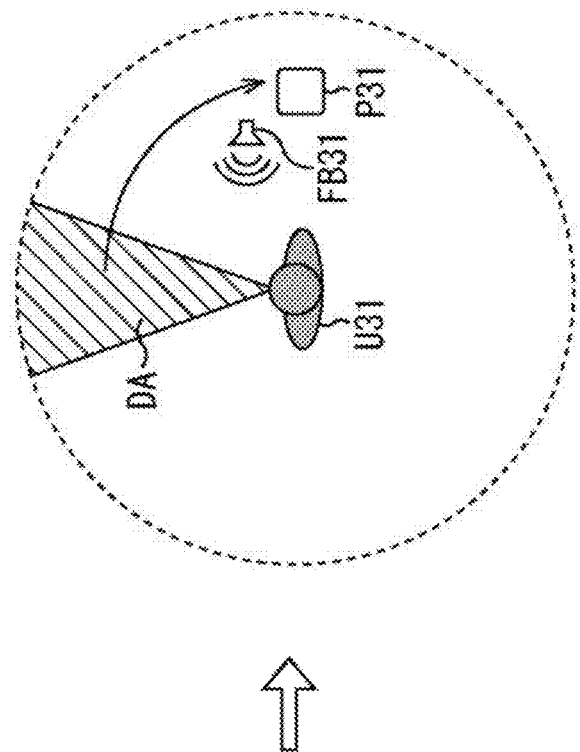
FIGS. 22A and 22B depict diagrams for explaining an example of a feedback output.
Figure 22A:
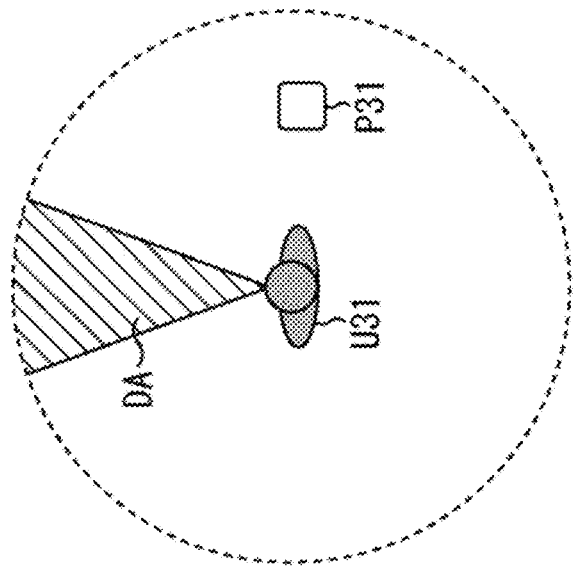

For example, it is assumed that, as depicted in FIG. 22A, an indication P31 which is desired to be presented to a user is located on the right side of a user U31 who is facing a predetermined direction. In this case, the indication P31 is located outside the display region DA of the display section 53 of the AR-HMD 10C which the user U31 wears. Thus, the user U31 cannot see the indication P31.

Therefore, as depicted in FIG. 22B, the loudspeaker 54 is caused to stereophonically output feedback FB31 from the front side of the user U31 toward the right direction while moving the coordinates of the sound source so as to draw an arc such that the visual field (i.e., the display region DA) of the user U31 is guided to the right direction thereof.

Figure 23B:
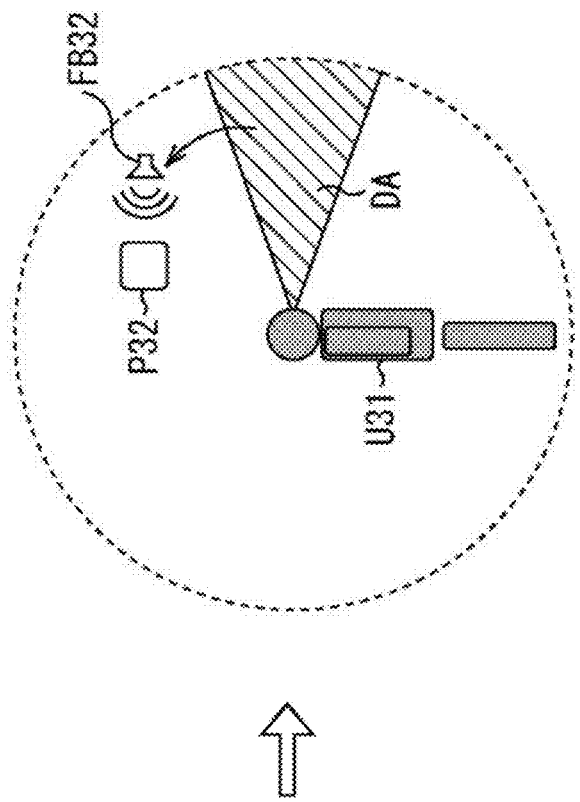
FIGS. 23A and 23B depict diagrams for explaining an example of a feedback output.
Figure 23A:
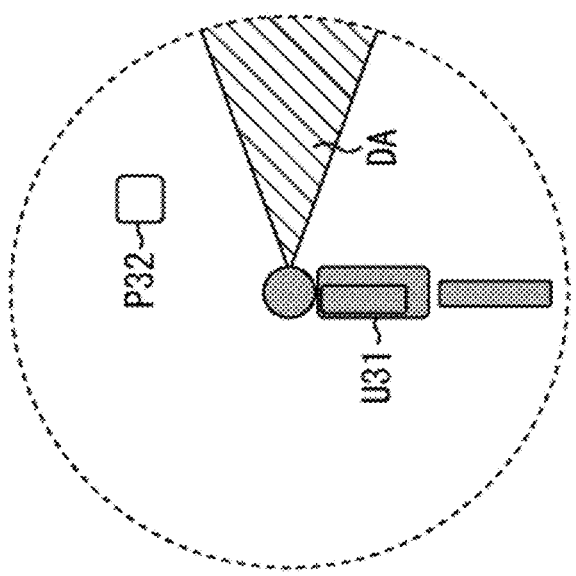

Further, it is assumed that, as depicted in FIG. 23A, an indication P32 which is desired to be presented to a user is located on the upper front side of a user U31 who is facing the direct front side. Also in this case, the indication P32 is located outside the display region DA of the display section 53 of the AR-HMD 10C which the user U31 wears. Thus, the user U31 cannot see the indication P32.

Therefore, as depicted in FIG. 23B, the loudspeaker 54 is caused to stereophonically output feedback FB32 from the direct front side of the user U31 toward the upper front side while moving the coordinates of the sound source so as to draw an arc such that the visual field (i.e., the display region DA) of the user U31 is guided to the upper front side.

Figure 24B:
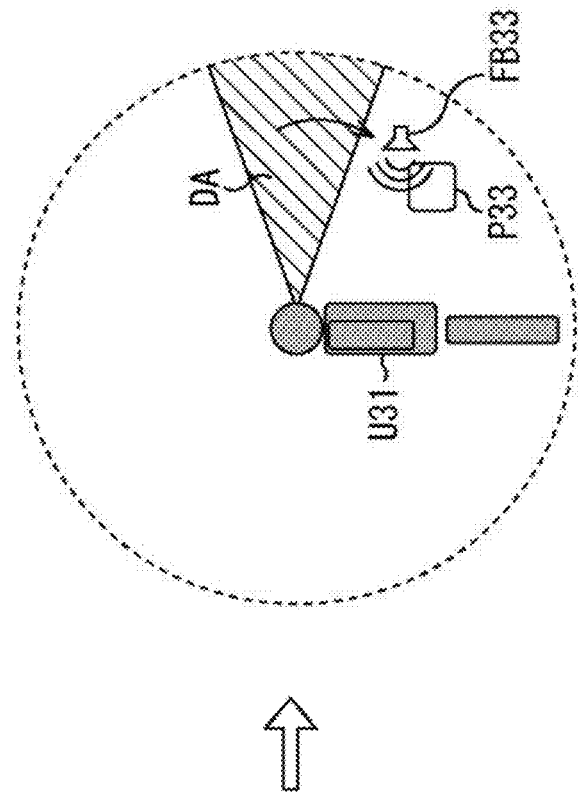
FIGS. 24A and 24B depict diagrams for explaining an example of a feedback output.
Figure 24A:
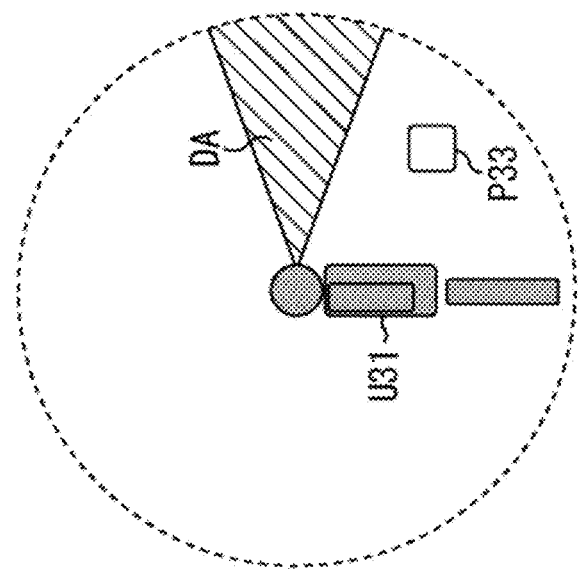

Moreover, it is assumed that, as depicted in FIG. 24A, an indication P33 which is desired to be presented to a user is located on the lower front side of a user U31 who is facing the direct front side. Also in this case, the indication P33 is located outside the display region DA of the display section 53 of the AR-HMD 10C which the user U31 wears. Thus, the user U31 cannot see the indication P33.

Therefore, as depicted in FIG. 24B, the loudspeaker 54 is caused to stereophonically output feedback FB33 from the direct front side of the user U31 toward the lower front side while moving the coordinates of the sound source so as to draw an arc such that the visual field (i.e., the display region DA) of the user U31 is guided to the lower front side.

Here, an intermittent sound such as "pip, pip, pip, . . . " may be used as a sound which is outputted as the feedback FB31, FB32, or FB33. The reason for this is that human ears are basically likely to recognize the coordinates of the sound source of a varying sound such as the aforementioned intermittent sound, rather than those of a continuous sound.

Moreover, human ears are considered to be likely to recognize the coordinates of the sound source of a sound the position of which is spatially moving, rather than those of a sound the position of which does not change. Therefore, besides the aforementioned pattern which draws an arc, various patterns including a pattern for passing by user's ears can be adopted as the moving route of the sound source.

According to the aforementioned process, the feedback output pattern using a sound regarding an indication is determined on the basis of the relative position relationship between the user and the indication. This makes it possible to effectively guide the visual field of the user without relying on a visual expression. In addition, since the sound source of a stereophonic sound is caused to present a feedback output while the coordinates of the sound source are being moved, the user can more easily grasp the spatial position of the indication, compared to a case where a sound is simply emitted from the position of the indication. Accordingly, feedback can be presented in a more appropriate output pattern to a user in accordance with the relative position relationship between the user and an indication.

Examples of Feedback

In the aforementioned examples, the coordinates of the sound source of audio feedback are moved on the basis of the relative position relationship between the user and the indication. However, other parameters for audio feedback may be changed on the basis of the relative position relationship between the user and the indication.

Although an audio system using HRTF (Head Related Transfer Function) convolution has been recently known, the front-rear direction or up-down direction of a sound field being reproduced cannot be easily recognized. According to some test reports, in such a field, a user feels as though the sound source of a sound in a high frequency band is disposed above the user and the sound source of a sound in a low frequency band was disposed below the user.

Therefore, in a case where the visual field (display region DA) of the user U31 is guided to the upper front side thereof in the aforementioned example in FIGS. 23A and 23B, the frequency of the sound source of the stereophonic feedback FB32 is gradually increased while the coordinates of the sound source are being moved from the direct front side toward the upper front side of the user U31.

Further, in a case where the visual field (display region DA) of the user U31 is guided toward the lower front side in the aforementioned example in FIGS. 24A and 24B, the frequency of the stereophonic feedback FB32 is gradually lowered while the coordinates of the sound source of the feedback FB32 are being moved from the direct front side toward the lower front side of the user U31.

Accordingly, the visual field of the user U31 can be more reliably guided to an indication.

Also, feedback may be outputted from an external loudspeaker in place of the loudspeaker 54 installed in the AR-HMD 10C.

Figure 25B:
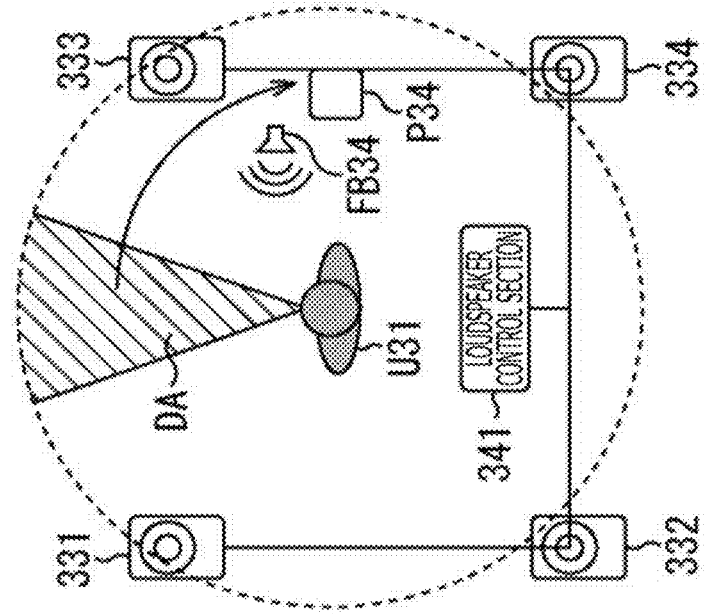
FIGS. 25A and 25B depict diagrams for explaining an example of a feedback output.
Figure 25A:
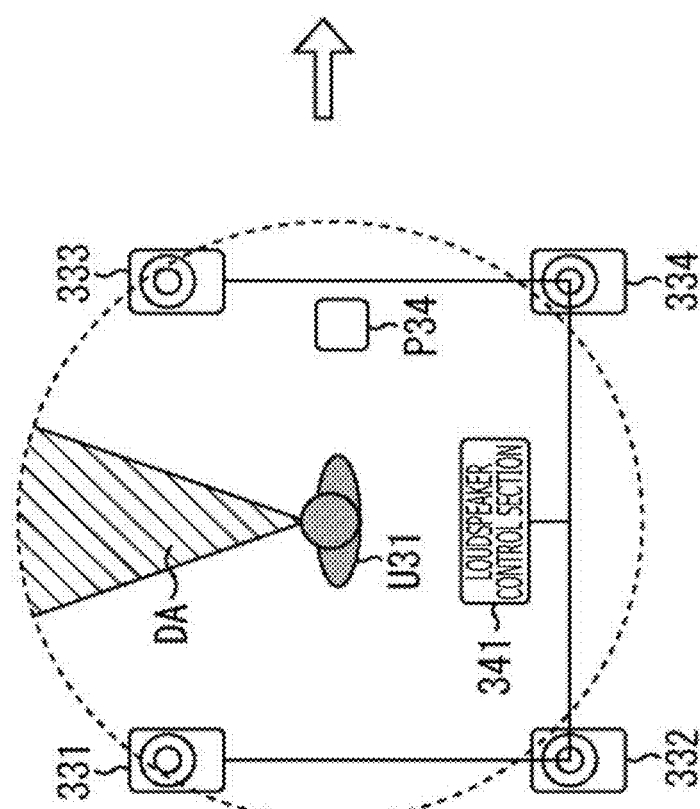

For example, in a space where the user U31 exists, loudspeakers 331 to 334 are provided at positions on a diagonally forward left side, a diagonally rearward left side, a diagonally forward right side, and a diagonally rearward right side of the user U31, respectively, as depicted in FIG. 25A.

The loudspeakers 331 to 334 output sounds under the control of a loudspeaker control section 341. Specifically, the loudspeaker control section 341 causes the loudspeakers 331 to 334 to output feedback in the output pattern determined by the output pattern determination section 313 of the AR-HMD 10C which the user U31 wears. Note that, in FIG. 25A, an indication P34 which is desired to be presented to the user is located on the right side of the user U31.

Therefore, in this case, the loudspeaker control section 341 controls the loudspeakers 331 to 334 to guide the visual field (display region DA) of the user U31 toward the right direction thereof, whereby feedback FB34 is stereophonically outputted while the coordinates of the sound source are being moved so as to draw an arc from the front side of the user U31 toward the right direction, as depicted in FIG. 25B.

Incidentally, the sound image estimation accuracy in a case where the head part is spontaneously turned becomes as high as the sound image estimation accuracy in a case where a sound source is moved. However, the sound image estimation accuracy in a case where the whole body is turned is lower than the sound image estimation accuracy in the case where only the head part is turned. For this reason, it is considered to be difficult to localize the sound source during walking which involves motion of the whole body, for example.

Therefore, an additional notification sound may be outputted in order to prevent a user from missing an indication when the indication enters the visual field of the user.

Figure 26B:
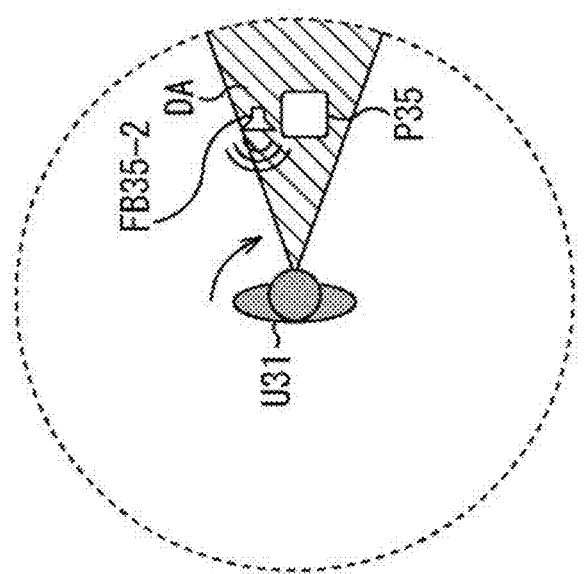
FIGS. 26A and 26B depict diagrams for explaining an example of a feedback output.
Figure 26A:
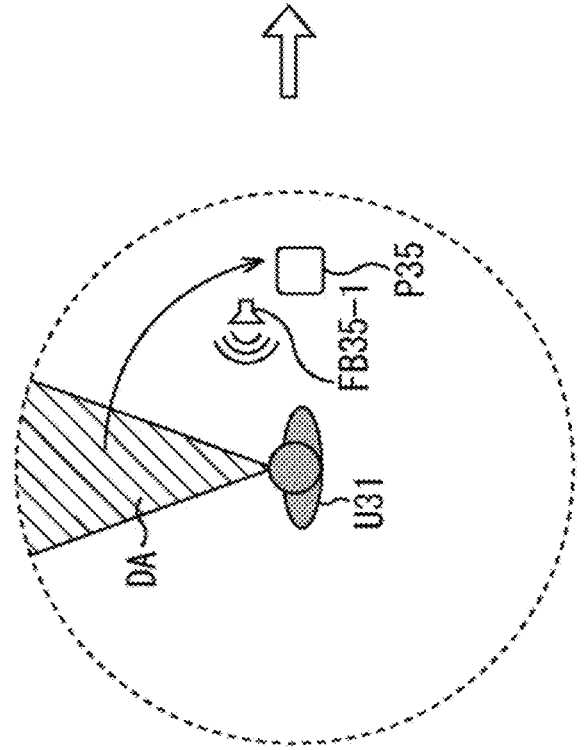

Specifically, it is assumed that, as depicted in FIG. 26A, feedback FB35-1 is stereophonically outputted to guide the visual field (display region DA) of the user U31 toward the right direction where the indication P35 is located, while the coordinates of the sound source are being moved so as to draw an arc from the front side of the user U31 toward the right direction.

Thereafter, when the whole body of the user U31 is turned toward the right direction in accordance with the guidance, that is, the indication P35 enters the visual field (display region DA) of the user U31 as depicted ink FIG. 26B, the loudspeaker 54 is caused to output audio feedback FB35-2 again to notify that the indication P35 exists in the display region DA.

Furthermore, in a case where, in addition to the indication which is desired to be presented to the user, another indication exists in a direction to which the user has been guided in accordance with the acoustic feedback, a visual assist may be provided.

Figure 27C:
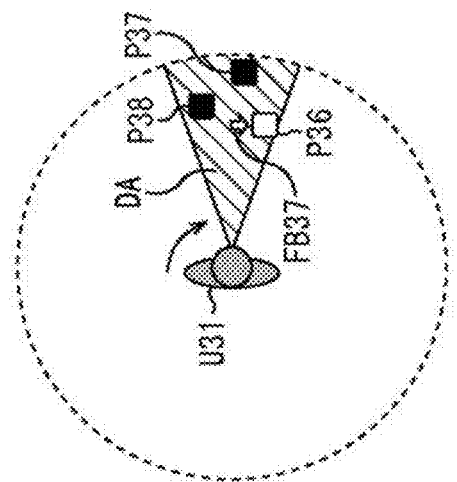
FIGS. 27A, 27B, and 27C depict diagrams for explaining an example of a feedback output.
Figure 27B:
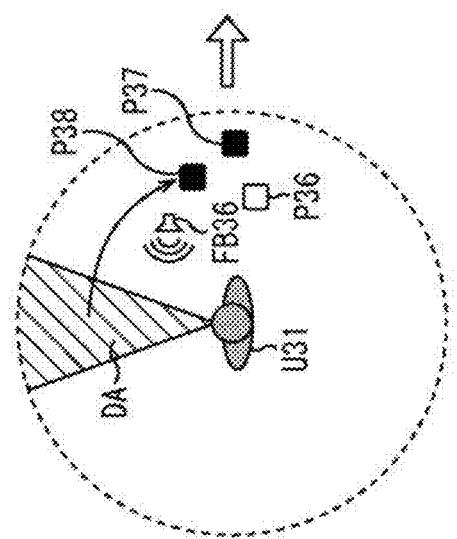
Figure 27A:
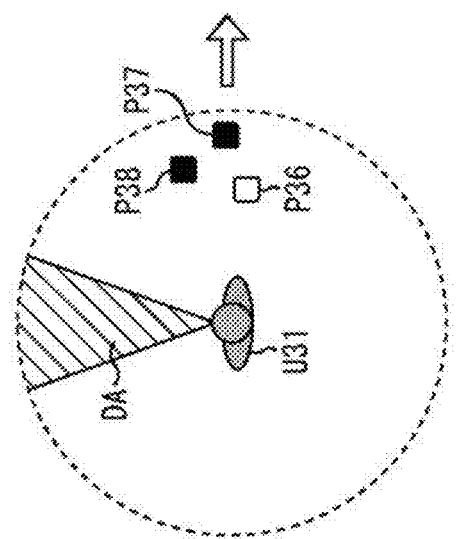

For example, it is assumed that, in addition to the indication P36 which is desired to be presented to the user, additional indications P37 and P38 exist on the right side of the user U31 who is facing a predetermined direction, as depicted in FIG. 27A.

In this case, as depicted in FIG. 27B, feedback FB36 is stereophonically outputted to guide the visual field (display region DA) of the user U31 toward the right direction thereof while the coordinates of the sound source are being moved so as to draw an arc from the front side of the user U31 toward the right direction.

Thereafter, when the whole body of the user U31 is turned to the right direction in accordance with the guidance, that is, when the indications P36, P37, and P38 enter the visual field (display region DA) of the user U31, as depicted in FIG. 27C, the display section 53 is caused to display feedback FB37 for pointing out the indication P36 which is desired to be presented to the user. In the example in FIGS. 27A, 27B, and 27C, the feedback FB37 is displayed as an arrow icon for indicating the position of the indication P36. However, the feedback FB37 may be a highlight image for highlighting the indication P36, for example.

Note that, in the present embodiment, the aforementioned feedback output patterns may be implemented in an arbitrary combination.

Further, in the aforementioned examples, the target which is desired to be presented to the user is a virtual object. However, the target may be a real object that exists in a real space.

Note that the present embodiment may be combined with at least any one of the first embodiment regarding the content (icon) layout display or the second embodiment regarding the control of a feedback output. In particular, in a case where the present embodiment is combined with the second embodiment, determination on the seeking period of time of the second embodiment can be adopted as a condition for the feedback of the present embodiment.

5. Fourth Embodiment

In general, in an AR-HMD that presents information in a real space surrounding a user, a virtual object (annotation) can be displayed at an arbitrary position in the surrounding space. For example, as depicted in FIG. 28A, a virtual object A41 indicating the position of a real object R41 that exists in a real space can be displayed, as feedback to a user, so as to match the position of the real object R41.

However, in a real space, the surrounding people or objects move or a user wearing an AR-HMD moves so that a real object which is desired to be presented to the user is shielded by another real object in some cases.

For example, as depicted in FIG. 28B, a person H42 moves so that the real object R41 may be shielded by the person H42. Also, as depicted in FIG. 28C, a user wearing an AR-HMD moves so that the real object R41 may be shielded by a wall W42. In these cases, feedback regarding a real object which is desired to presented to the user cannot be properly displayed.

For this reason, the user can miss or cannot find out the real object. Meanwhile, in a case where excessive feedback is outputted through displays or sounds in order to make it easy to find out such a real object, the feedback may inhibit an AR application experience itself, or may interrupt content viewing.

Therefore, the present embodiment changes the display format of feedback regarding a real object which is desired to be presented to a user, on the basis of the status of the surrounding environment of the real object.

For example, in a case where, while a virtual object indicating the position of a target (real object) which is desired to be presented to a user is displayed as feedback, the target is shielded by a moving body such as a person or a vehicle, the feedback display format is maintained without a change on the presumption that the target will come into a non-shielded state within a short period of time. On the other hand, in a case where the target is shielded by a non-moving fixed body such as a wall or a desk, the feedback display format is changed by changing the display position of the virtual object or displaying a new virtual object for indicating a route to the target.

Functional Configuration Example of AR-HMD

Figure 29:
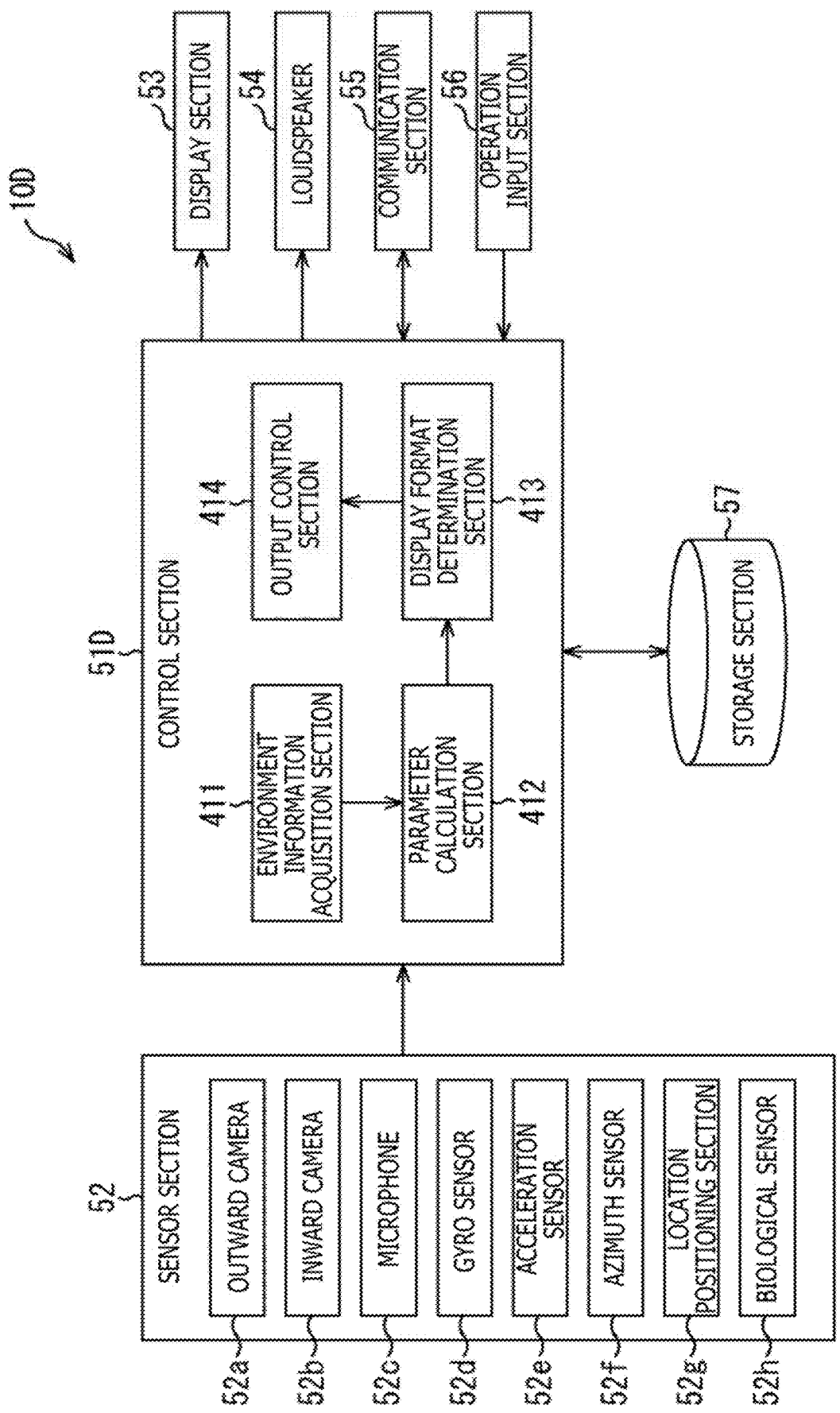
FIG. 29 is a block diagram depicting a functional configuration example of an AR-HMD according to a fourth embodiment.

FIG. 29 is a block diagram depicting a functional configuration example of an AR-HMD 10D according to the present embodiment.

Note that the AR-HMD 10D in FIG. 29 differs from the AR-HMD 10 in FIG. 3 in that the AR-HMD 10D is provided with a control section 51D in place of the control section 51.

The control section 51D causes a feedback output section to output feedback indicating the position of a first real object on the basis of the position relationship between the first real object and a second real object which is different from the first real object. Further, on the basis of the position relationship between the first real object and the second real object and on the basis of a parameter concerning the second real object, the control section 51D controls the AR-HMD 10D (display section 53) such that a virtual object which is given to a target (first real object) located in the display region of the display section 53 is changed.

Specifically, the control section 51D implements an environment information acquisition section 411, a parameter calculation section 412, a display format determination section 413, and an output control section 414.

The environment information acquisition section 411 acquires environment information indicating the status of the surrounding environment of a target (real object) which is desired to be presented to a user wearing the AR-HMD 10D on the basis of sensor information acquired from the sensor section 52.

The parameter calculation section 412 calculates a parameter concerning the status of the surrounding environment of the target on the basis of the environment information acquired by the environment information acquisition section 411.

The display format determination section 413 determines a feedback display format regarding the target on the basis of the parameter calculated by the parameter calculation section 412.

The output control section 414 causes the display section 53 to output feedback in the display format determined by the display format determination section 413.

(Feedback Output Process)

Figure 30:
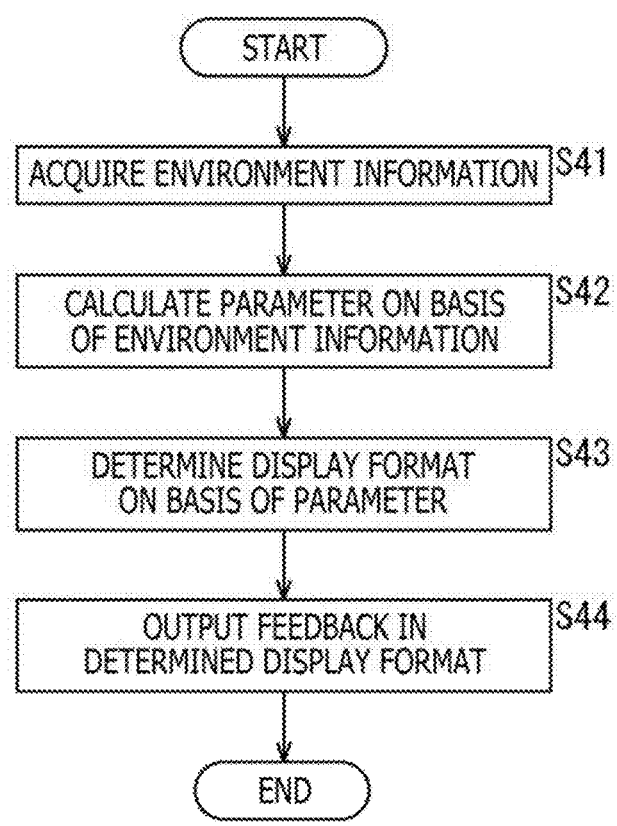
FIG. 30 is a flowchart for explaining a feedback output process.

Next, a feedback output process which is executed by the AR-HMD 10D will be explained with reference to a flowchart in FIG. 30.

In step S41, the environment information acquisition section 411 acquires environment information on the basis of sensor information from the sensor section 52. Note that, by acquiring user action information or position/attitude information from the sensor section 52, the environment information acquisition section 411 may detect movement of the user, which will be described later, and improve the accuracy of detecting the position of the real object or the accuracy of the display position of the virtual object based on the environment information.

For example, information regarding the depth of the surrounding environment is acquired as the environment information. The depth information may be a Depth Map which is obtained by a stereo camera or may be distance information obtained by ToF ranging.

Moreover, as the environment information, substance information indicating the shape or type of a substance located in the environment is acquired. The substance information is obtained by substance shape recognition based on a Depth Map or shape recognition based on image processing.

Note that the environment information is acquired in real time. However, the time-series change of the environment information may be tracked.

In step S42, the parameter calculation section 412 calculates a parameter representing the motion or type of another real object that exists in the surrounding area of the target, on the basis of the environment information.

In step S43, the display format determination section 413 determines a feedback display format (e.g., the shape of a virtual object to be displayed) regarding the target on the basis of the calculated parameter, that is, on the basis of the motion or type of another real object existing in the surrounding area of the target.

Next, in step S44, the output control section 414 causes the display section 53 to display feedback in the determined display format.

For example, it is assumed that, a virtual object A41 indicating the position of a real object R41 which is a target is displayed so as to match the position of the real object R41, as depicted in FIG. 31A.

In a case where, from this state, a person H42 moves to shield the real object R41 as depicted in FIG. 31B, the feedback display format is maintained to keep the virtual object A41 on the presumption that the real object R41 will come into a non-shielded state within a short period of time on the basis of the movement of the person H42 (motion) or the fact that the person H42 is a moving body (type).

Further, in a case where the real object R41 is shielded by the wall W42 as a result of movement of the user as depicted in FIG. 31C, a new virtual object A42-1 indicating that the real object R41 exists behind the wall W42, or a new virtual object A42-2 indicating a route to the real object R41 located behind the wall W42 is displayed in place of the virtual object A41 on the basis of the fact that the wall W42 does not move (motion) or the fact that the wall W42 is a non-moving body (type).

According to the aforementioned process, the feedback display format of a real object which is desired to be presented to a user is changed on the basis of the status of the surrounding environment of the real object. Thus, feedback can be presented in a more appropriate display format to a user while an AR application experience itself is not inhibited or content viewing is not interrupted.

Examples of Feedback

In the aforementioned examples, the feedback display format is changed on the basis of the parameter which is the motion or type of another real object existing in the surrounding area of a target. However, the feedback display format may be changed on the basis of other parameters concerning the target.

For example, the feedback display format may be changed on the basis of the size of another real object existing in the surrounding area of the target.

Here, it is assumed that, as depicted in FIG. 32A, the virtual object A41 indicating the position of the real object R41 which is a target is displayed so as to match the position of the real object R41.

In a case where, from this state, the real object R41 is shielded by a long and thin columnar substance B43 as a result of movement of the user, for example, as depicted in FIG. 32B, the feedback display format is maintained to keep the virtual object A41 on the basis of the fact that the size of the substance B43 (the area shielding the virtual object A41) is small.

Further, in a case where the real object R41 is shielded by a cubic substance B44 which is larger than the real object R41 as a result of movement of the user, for example, as depicted in FIG. 32C, a virtual object A44 indicating that the real object R41 is located behind the substance B44 is displayed in place of the virtual object A41, on the basis of the fact that the size (the area shielding the virtual object A41) of the substance B44 is large.

Also, in a case where a plurality of real objects exists as targets, the feedback display format may be changed on the basis of the position relationship among the real objects.

Figure 33B:
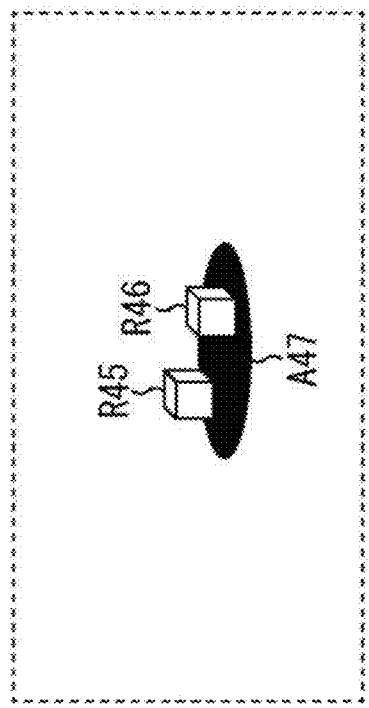
FIGS. 33A and 33B depict diagrams for explaining an example of a feedback output.
Figure 33A:
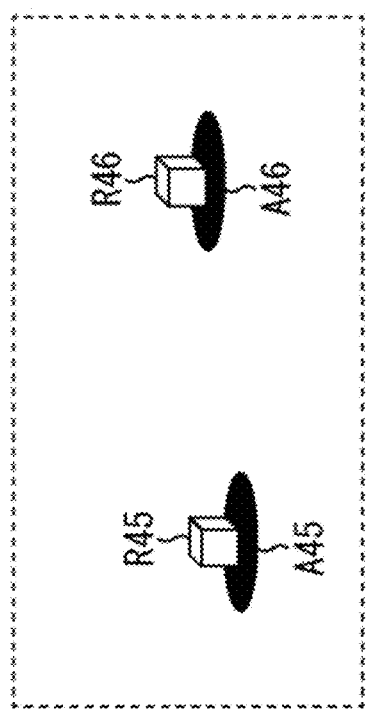

Specifically, in a case where two real objects R45 and R46 which are targets are located at positions separate from each other, or move away from each other as depicted in FIG. 33A, virtual objects A45 and A46 respectively corresponding to the real objects R45 and R46 are displayed as feedback to the real object R45 and R46, respectively.

On the other hand, in a case where the two real objects R45 and R46 which are targets are located at positions close to each other or approach each other as depicted in FIG. 33B, a virtual object A47 corresponding to both the real objects R45 and R46 is displayed as feedback to one group including the real objects R45 and R46.

Moreover, the feedback display format may be changed on the basis of a size (visible surface area of the display region), which is visible to the user, of a real object as a target.

Figure 34B:
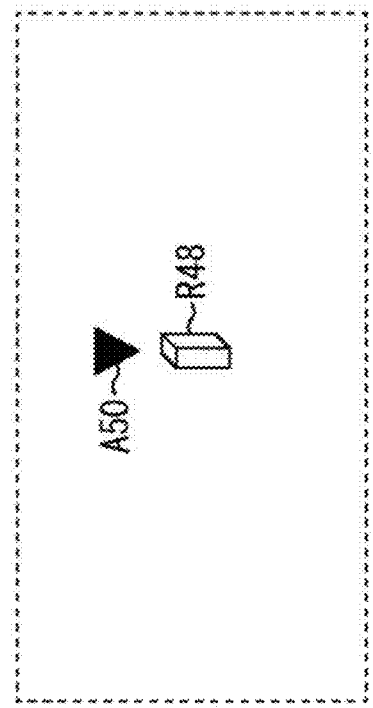
FIGS. 34A and 34B depict diagrams for explaining an example of a feedback output.
Figure 34A:
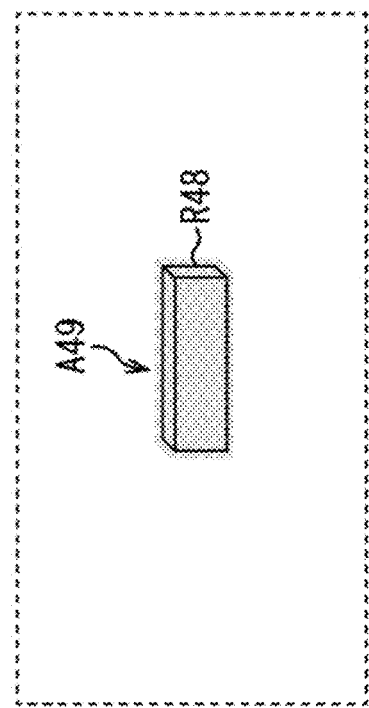

Specifically, in a case where a visible area of the real object R48 such as a side surface of a square column-shaped real object R48, is large as depicted in FIG. 34A, the display section 53 is caused to display, as feedback, a virtual object A49 for outstanding the real object R48 so as to be superimposed thereon.

On the other hand, in a case where a visible area of the real object R48 such as the bottom surface of the square column-shaped real object R48, is small as depicted in FIG. 34B, the display section 53 is caused to display, as feedback, a virtual object A50 indicating the position of the real object R48.

Note that, in the present embodiment, the aforementioned feedback display formats may be implemented in an arbitrary combination.

The embodiments of the technique according to the present disclosure are not limited to those having been described above, and various changes can be made within the scope of the gist of the present technique.

For example, the present technique can be applied to an AR-HUD (AR-use HUD), as appropriate, although the examples in which the present technique is mainly applied to an AR-HMD have been explained in the aforementioned embodiments.

In addition, the present technique can have a cloud computing configuration in which one function is allocated to a plurality of devices over a network, and is processed cooperatively by the devices.

In addition, the steps having been explained in each of the aforementioned flowcharts may be executed by one device, or may be allocated to a plurality of devices and executed by the devices.

Moreover, in a case where one step includes a plurality of processes, the plurality of processes included in the one step may be executed by one device, or may be allocated to a plurality of devices and executed by the devices.

Note that the present technique also may have the following configurations.

(1)
An information processing device including:
a control section that controls an output associated with a position of an object which is disposed in a three-dimensional space, on the basis of user action information indicating a user's action and a position relationship between a display region of a display device and the object.

(2)
The information processing device according to (1), in which
the object includes a first virtual object which is displayed in the display region,
the output associated with the position of the object includes an output, by the display device, of a second virtual object which is different from the first virtual object, and
on the basis of the user action information and a position relationship between the display region and the first virtual object, the control section moves the second virtual object located outside the display region, into the display region.

(3)
The information processing device according to (2), in which
the user action information includes information regarding a change in a first distance between the user and the first virtual object being displayed in the display region, and
on the basis of the change in the first distance, the control section moves the second virtual object located outside the display region, into the display region.

(4)
The information processing device according to (2), in which
the user action information includes information regarding a change in a visual line position of the user with respect to the first virtual object being displayed in the display region, and
on the basis of the change in the visual line position, the control section moves the second virtual object located outside the display region, into the display region.

(5)
The information processing device according to (1), in which
the object includes a third virtual object which is located outside the display region,
the output associated with the position of the object includes a feedback output indicating a position of the third virtual object, and
on the basis of the user action information and a position relationship between the display region and the third virtual object, the control section controls the feedback output.

(6)
The information processing device according to (5), in which
the user action information includes information regarding a change in a second distance between the user and the third virtual object located outside the display region, and
the control section stepwisely controls the feedback output in accordance with the change in the second distance.

(7)
The information processing device according to (6), in which
in a case where the second distance is decreased, the control section increases the feedback output.

(8)
The information processing device according to (5), in which the control section stepwisely controls the feedback output in accordance with a period of time taken for the user to seek out the third virtual object located outside the display region.

(9)
The information processing device according to (5), in which
in a case where a speech spoken by the user is detected, the control section makes the feedback output smaller than that in a case where no speech spoken by the user is detected.

(10)
The information processing device according to (5), in which
on the basis of a relative position relationship between the user and the third virtual object located outside the display region, the control section causes a sound source which is configured to present the feedback output, to stereophonically present the feedback output while moving coordinates of the sound source.

(11)
The information processing device according to (10), in which
the control section causes the sound source to stereophonically present the feedback output while changing a frequency of the sound source.

(12)
The information processing device according to (1), in which
the object includes a first real object,
the output associated with the position of the object includes a feedback output indicating a position of the first real object, and
the control section controls the feedback output on the basis of a position relationship between the first real object and a second real object which is different from the first real object.

(13)
An information processing method including:
controlling an output associated with a position of an object which is disposed in a three-dimensional space, on the basis of user action information indicating a user's action and a position relationship between a display region of a display device and the object.

(14)
A program for causing a computer to execute a process including:
controlling an output associated with a position of an object which is disposed in a three-dimensional space, on the basis of user action information indicating a user's action and a position relationship between a display region of a display device and the object.

(15)
An information processing device including:
a control section that controls a display device such that a virtual object which is given to a first real object is changed on the basis of a position relationship between the first real object and a second real object which is different from the first real object and a parameter concerning the second real object.

(16)
The information processing device according to (15), in which
the virtual object includes a first virtual object and a second virtual object having a shape different from that of the first virtual object, and the control section controls the display device to give either the first virtual object or the second virtual object to the first real object on the basis of the parameter concerning the second real object.

(17)

The information processing device according to (16), in which the parameter represents movement of the second real object shielding the first real object.

(18)

The information processing device according to (16), in which in a case where the second real object is a moving body, the control section controls the display device to substantially maintain the first virtual object given to the first real object, and in a case where the second real object is a non-moving body, the control section controls the display device to change the first virtual object given to the first real object, to the second virtual object.

(19)

The information processing device according to (16), in which the parameter represents a size of the second real object shielding the first real object.

(20)

The information processing device according to (15), in which the virtual object includes a first virtual object and a second virtual object which is different from the first virtual object, in a case where the first real object has a first size, the control section controls the display device to superimpose the first virtual object on the first real object, and in a case where the first real object has a second size which is smaller than the first size, the control section controls the display device such that the second virtual object indicates a position of the first real object and the second virtual object is not superimposed on the first real object.

REFERENCE SIGNS LIST 10, 10A to 10D AR-HMDs, 51, 51A to 51D Control sections, 52 Sensor section, 53 Display section, 54 Loudspeaker, 55 Communication section, 56 Operation input section, 57 Storage section, 71 Sensor information acquisition section, 72 Parameter calculation section, 73 Determination section, 74 Output control section, 111 Sensor information acquisition section, 112 Parameter calculation section, 113 Layout determination section, 114 Output control section, 211 Sensor information acquisition section, 212 Parameter calculation section, 213 Output format determination section, 214 Output control section, 311 Sensor information acquisition section, 312 Parameter calculation section, 313 Output pattern determination section, 314 Output control section, 411 Environment information acquisition section, 412 Parameter calculation section, 413 Display format determination section, 414 Output control section

The invention claimed is:

1. An information processing device, comprising:
a control section configured to:
control a specific output associated with a position of an object, wherein
the object is in a three-dimensional space,
the specific output is controlled based on user action information indicating a user's action, and a position relationship between a display region of a display device and the object, and
the object includes a first virtual object located outside the display region; and
control a first feedback output based on the user action information and a position relationship between the display region and the first virtual object, wherein the first feedback output indicates a position of the first virtual object.

2. The information processing device according to claim 1, wherein
the object further includes a second virtual object displayed in the display region,
the specific output includes an output, by the display device, of a third virtual object that is different from the second virtual object, and
the control section is further configured to move, based on the user action information and a position relationship between the display region and the second virtual object, the third virtual object from outside the display region to inside the display region.

3. The information processing device according to claim 2, wherein
the user action information includes information associated with a change in a first distance between the user and the second virtual object being displayed in the display region, and
the control section is further configured to move, based on the change in the first distance, the third virtual object from outside the display region to inside the display region.

4. The information processing device according to claim 2, wherein
the user action information further includes second information regarding a change in a visual line position of the user with respect to the second virtual object, and
the control section is further configured to move, based on the change in the visual line position, the third virtual object from outside the display region to inside the display region.

5. The information processing device according to claim 1, wherein
the user action information further includes second information regarding a change in a second distance between the user and the first virtual object, and
the control section is further configured to stepwisely control the first feedback output based on the change in the second distance.

6. The information processing device according to claim 5, wherein
the control section is further configured to increase the first feedback output.

7. The information processing device according to claim 1, wherein
the control section is further configured to stepwisely control the first feedback output based on a period of time taken for the user to seek out the first virtual object.

8. The information processing device according to claim 1, wherein
the control section is further configured to control the first feedback output based on detection of no speech spoken by the user,
the control section is further configured to control a second feedback output based on detection of a speech spoken by the user, and the second feedback output is smaller than the first feedback output.

9. The information processing device according to claim 1, wherein
the control section is further configured to control a sound source to stereophonically present the first feedback output,
the sound source is controlled based on a relative position relationship between the user and the first virtual object, and
the control section is further configured to move coordinates of the sound source while the first feedback output is stereophonically presented.

10. The information processing device according to claim 9, wherein
the control section is further configured to:
control the sound source to stereophonically present the first feedback output; and
change a frequency of the sound source while the first feedback output is stereophonically presented.

11. The information processing device according to claim 1, wherein
the object further includes a first real object,
the specific output includes a second feedback output indicating a position of the first real object,
the control section is further configured to control the second feedback output based on a position relationship between the first real object and a second real object, and
the second real object is different from the first real object.

12. An information processing method, comprising:
controlling a specific output associated with a position of an object, wherein
the object is in a three-dimensional space,
the specific output is controlled based on each of user action information indicating a user's action and a position relationship between a display region of a display device and the object, and
the object includes a virtual object that is located outside the display region; and
controlling a feedback output based on the user action information and a position relationship between the display region and the virtual object, wherein the feedback output indicates a position of the virtual object.

13. A non-transitory computer-readable medium having stored thereon computer-executable instructions that, when executed by an information processing device, cause the information processing device to execute operations, the operations comprising:
controlling a specific output associated with a position of an object, wherein
the object is in a three-dimensional space,
the specific output is controlled based on each of user action information indicating a user's action and a position relationship between a display region of a display device and the object, and
the object includes a virtual object that is located outside the display region; and
controlling a feedback output based on the user action information and a position relationship between the display region and the virtual object, wherein the feedback output indicates a position of the virtual object.

14. An information processing device, comprising:
a control section configured to:
control a display device to change a display of a virtual object associated with a first real object, wherein
the display of the virtual object is changed based on each of a position relationship between the first real object and a second real object and a parameter concerning the second real object,
the second real object is different from the first real object,
the virtual object includes a first virtual object and a second virtual object, and
a shape of the second virtual object is different from a shape of the first virtual object; and
control the display device to display one of the first virtual object or the second virtual object based on the parameter concerning the second real object.

15. The information processing device according to claim 14, wherein
the parameter represents movement of the second real object that shields the first real object.

16. The information processing device according to claim 14, wherein the control section is further configured to:
control, based on the second real object is a moving body, the display device to substantially maintain the display of the first virtual object associated with the first real object, and
control, based on the second real object is a non-moving body, the display device to change the display of the first virtual object associated with the first real object to the display of the second virtual object associated with the first real object.

17. The information processing device according to claim 14, wherein
the parameter represents a size of the second real object that shields the first real object.

18. The information processing device according to claim 14, wherein the control section is further configured to:
control, based on the first real object that has a first size, the display device to superimpose the first virtual object on the first real object, and
control, based on the first real object that has a second size smaller than the first size, the display device to display the second virtual object, wherein
the display of the second virtual object indicates a position of the first real object, and
the display of the second virtual object is not superimposed on the first real object.

19. An information processing device, comprising:
a control section configured to:
control a specific output associated with a position of an object, wherein
the object is in a three-dimensional space,
the specific output is controlled based on each of user action information indicating a user's action and a position relationship between a display region of a display device and the object, and
the object includes a first real object; and
control a feedback output based on the user action information and a position relationship between the first real object and a second real object, wherein
the feedback output indicates a position of the first real object, and
the second real object is different from the first real object.

* * * * *